United States Patent
Xiao et al.

(10) Patent No.: US 9,575,602 B1
(45) Date of Patent: Feb. 21, 2017

(54) MULTI-TOUCH DISAMBIGUATION

(71) Applicant: MONTEREY RESEARCH, LLC, Santa Clara, CA (US)

(72) Inventors: Browley Xiao, Shanghai (CN); Nelson Chow, San Mateo, CA (US); Victor P. Drake, Clyde Hill, WA (US); Igor Polishchuk, Fremont, CA (US)

(73) Assignee: MONTEREY RESEARCH, LLC, Santa Clara, CA (US)

( * ) Notice: Subject to any disclaimer, the term of this patent is extended or adjusted under 35 U.S.C. 154(b) by 0 days.

(21) Appl. No.: 13/915,328

(22) Filed: Jun. 11, 2013

Related U.S. Application Data

(63) Continuation of application No. 12/684,791, filed on Jan. 8, 2010, now Pat. No. 8,462,135.

(60) Provisional application No. 61/145,457, filed on Jan. 16, 2009, provisional application No. 61/143,199, filed on Jan. 8, 2009.

(51) Int. Cl.
*G06F 3/045* (2006.01)
*G06F 3/044* (2006.01)
*G06F 3/041* (2006.01)

(52) U.S. Cl.
CPC ............. *G06F 3/044* (2013.01); *G06F 3/0416* (2013.01); *G06F 2203/04104* (2013.01)

(58) Field of Classification Search
CPC ................... G06F 3/044; G06F 3/0416; G06F 2203/04104
USPC .......................................... 345/156, 173–174
See application file for complete search history.

(56) References Cited

U.S. PATENT DOCUMENTS

| | | | |
|---|---|---|---|
| 5,495,077 | A | 2/1996 | Miller et al. |
| 5,872,561 | A | 2/1999 | Figie et al. |
| 7,428,191 | B1 | 9/2008 | Klein |
| 7,982,723 | B2 | 7/2011 | Ningrat |
| 2008/0048997 | A1* | 2/2008 | Gillespie et al. ............. 345/174 |
| 2008/0150906 | A1 | 6/2008 | Grivna |
| 2009/0096757 | A1 | 4/2009 | Hotelling et al. |
| 2009/0128516 | A1 | 5/2009 | Rimon et al. |
| 2009/0160787 | A1 | 6/2009 | Westerman et al. |
| 2009/0284495 | A1* | 11/2009 | Geaghan et al. ............. 345/174 |
| 2010/0007631 | A1 | 1/2010 | Chang |
| 2010/0039405 | A1* | 2/2010 | Chen et al. ................... 345/174 |

(Continued)

OTHER PUBLICATIONS

U.S. Appl. No. 12/684,791: "Multi-Touch Disambiguation," Browley Xiao, filed Jan. 18, 2010; 79 pages.

(Continued)

*Primary Examiner* — Christopher E Leiby
(74) *Attorney, Agent, or Firm* — Kunzler Law Group, PC

(57) ABSTRACT

A capacitance sensing method may include performing a first scan of a plurality of sensor elements of a touch-sensing surface to detect a plurality of capacitance values indicating a presence of multiple contacts at the touch sensing surface. Based on the plurality of capacitance values, a plurality of coordinates may be calculated that indicate a plurality of possible contact locations for the multiple contacts. In response to detecting that the plurality of coordinates indicates the presence of the multiple contacts, a resolve scan of at least a first intersection of sensor elements may be performed, where the first intersection corresponds to at least one of the possible contact locations. Based on the resolve scan, at least one of the possible contact locations may be identified as an actual contact location of one of the multiple contacts.

20 Claims, 16 Drawing Sheets

(56) References Cited

U.S. PATENT DOCUMENTS

2010/0073301 A1  3/2010  Yousefpor et al.
2010/0097328 A1  4/2010  Simmons et al.

OTHER PUBLICATIONS

USPTO Advisory Action for U.S. Appl. No. 12/684,791 dated Jul. 30, 2012; 3 pages.
USPTO Advisory Action for U.S. Appl. No. 12/684,791 dated Sep. 7, 2012; 3 pages.
USPTO Final Rejection for U.S. Appl. No. 12/684,791 dated Jun. 4, 2012; 16 pages.
USPTO Non-Final Rejection for U.S. Appl. No. 12/684,791 dated Feb. 14, 2012; 15 pages.
USPTO Non-Final Rejection for U.S. Appl. No. 12/684,791 dated Nov. 16, 2012; 17 pages.
USPTO Notice of Allowance for U.S. Appl. No. 12/684,791 dated Mar. 18, 2013; 8 pages.

* cited by examiner

MULTI-TOUCH DISAMBIGUATION

RELATED APPLICATIONS

This application is a continuation of U.S. application Ser. No. 12/684,791, filed Jan. 8, 2010, now U.S. Pat. No. 8,462,135, issued Jun. 11, 2013, which claims priority to U.S. Provisional Patent Application No. 61/145,457, filed Jan. 16, 2009, and claims priority to U.S. Provisional Patent Application No. 61/143,199, filed Jan. 8, 2009 all of which are incorporated by reference herein in their entirety.

TECHNICAL FIELD

This disclosure relates to the field of user interface devices and, in particular, to disambiguation of multiple touches at a touch sensing surface.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of an object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include, for example, sensor arrays having two dimensions for detecting movement in a plane. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch panels, or touchscreen panels, are transparent display overlays which are typically either pressure-sensitive (resistive or piezoelectric), electrically-sensitive (capacitive), acoustically-sensitive (surface acoustic wave (SAW)), or photo-sensitive (infrared). The effect of such overlays allows a display to be used as an input device, removing the keyboard and/or the mouse as the primary input device for interacting with the display's content. Such displays can be attached to computers or, as terminals, to networks. There are a number of types of touch screen technologies, such as optical imaging, resistive, surface acoustical wave, capacitive, infrared, dispersive signal, piezoelectric, and strain gauge technologies. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to press the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

Figure 1:
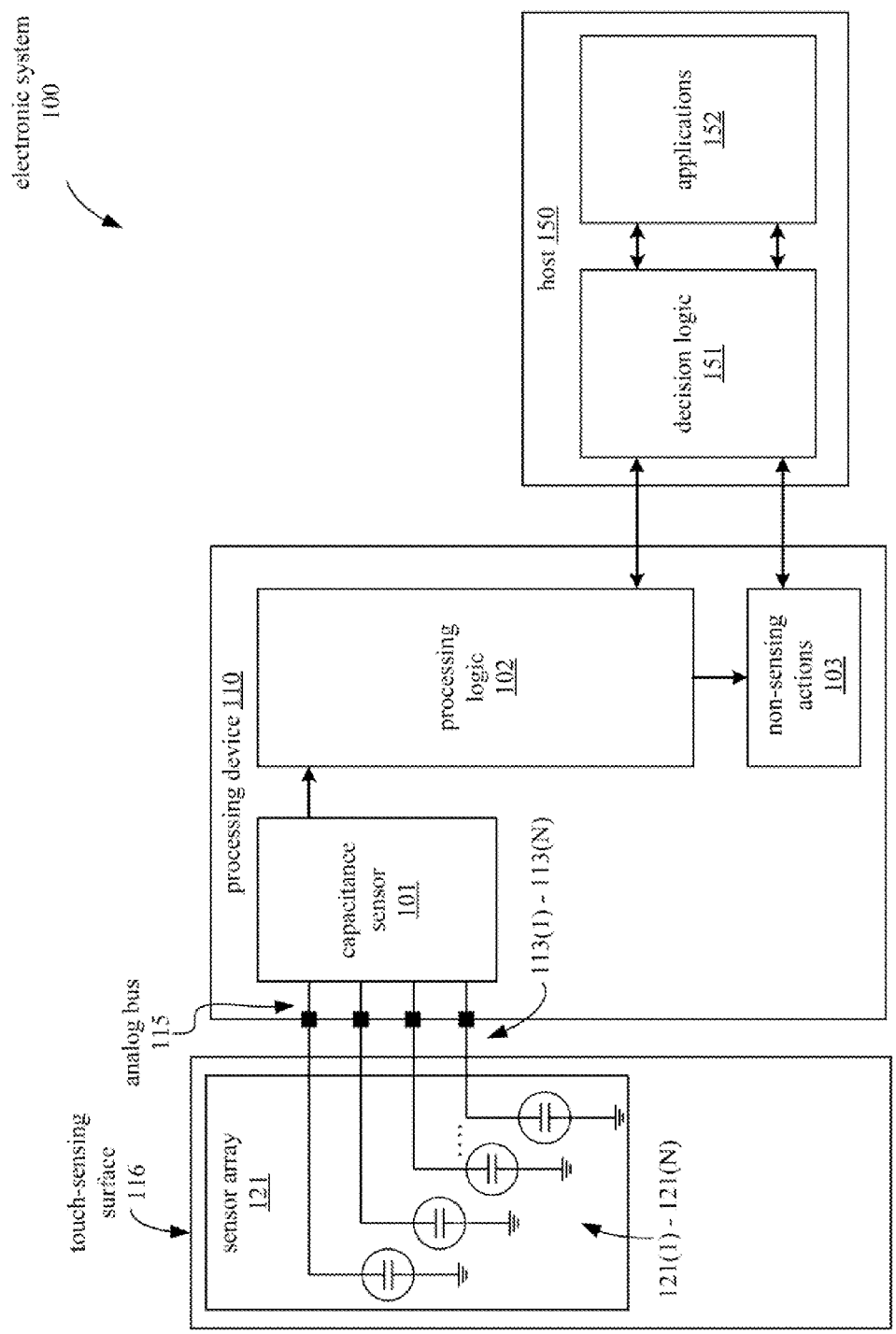
FIG. 1 illustrates a block diagram of one embodiment of an electronic system that processes touch sensor data.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

One embodiment of a multi-touch gesture trackpad or other device including a touch sensing surface operates by performing self-capacitance measurements on each of the rows and columns in an array of touch sensing elements, including row elements and column elements, at the touch sensing surface. These measurements can be represented as a histogram of measured values for the row elements and a histogram of measured values for the column elements. For detecting a single contact at the touch sensing surface, the peak of each histogram indicates the row and column location of the contact.

In one embodiment, when multiple touches are applied to such a touch sensing surface, the row and column histograms may have two or more peaks such that the system cannot distinguish the actual locations of the contacts at the touch sensing surface based on the histograms alone. For example, two touches at a touch sensing surface that are not aligned in either the X or Y directions may result in two peaks for each of the row and column histograms, indicating four possible contact locations. To determine which of the possible touch locations is a location of an actual contact, the system may perform a disambiguation process.

The touch sensing system may perform a resolve scan as part of a disambiguation process. In one embodiment, the resolve scan may include measurements of sensor elements corresponding to the histogram peaks. For example, two touches at the touch sensing surface may result in four histogram peaks (two row peaks and two column peaks) and four possible touch locations. These four possible contact locations can be disambiguated to determine the locations of the original two actual contacts by performing a measurement of the sensor elements intersecting at least one of the possible contact locations to determine whether an actual contact is present at the measured possible contact location.

In cases where more than two actual contacts are applied to the touch sensing surface, the number of possible contact locations also increases. For example, three actual contacts may result in up to three peaks for each of the row and column histograms, which correspond to nine possible contact locations. A resolve scan may be performed to determine whether an actual contact is present at each of these possible contact locations. In one embodiment, deducing the locations of all the actual contacts does not require scanning all of the possible contact locations and may be accomplished with a resolve scan that includes only some of the possible contact locations.

In an alternative embodiment, the resolve scan may include two or more measurements of a sensor element corresponding to one of the histogram peaks. The two measurements may be compared to determine whether the location of an actual contact is closer to a first end of the sensor element or a second end of the sensor element. For example, where two possible contact locations are present at a sensor element, the resolve scan may identify which of the two possible contacts is an actual contact by determining that the actual contact is closer to one end of the sensor element or another.

FIG. 1 illustrates a block diagram of one embodiment of an electronic system 100 including processing logic 102 that may be configured to perform a disambiguation process for determining locations of multiple touches at a touch sensing surface. The electronic device 100 includes a touch-sensing surface 116 (e.g., a touchscreen, or a touch pad) coupled to a processing device 110 and a host 150. In one embodiment, the touch-sensing surface 116 is a two-dimensional user interface that uses a sensor array 121 to detect touches on the surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via an analog bus 115 transporting multiple signals. In this embodiment, each sensor element 121(1)-121(N) is represented as a capacitor. The capacitance of each sensor in the sensor array 121 is measured by a capacitance sensor 101 in the processing device 110.

In one embodiment, the capacitance sensor 101 may include a relaxation oscillator or other means to convert a capacitance into a measured value. The capacitance sensor 101 may also include a counter or timer to measure the oscillator output. The capacitance sensor 101 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array, tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2A:
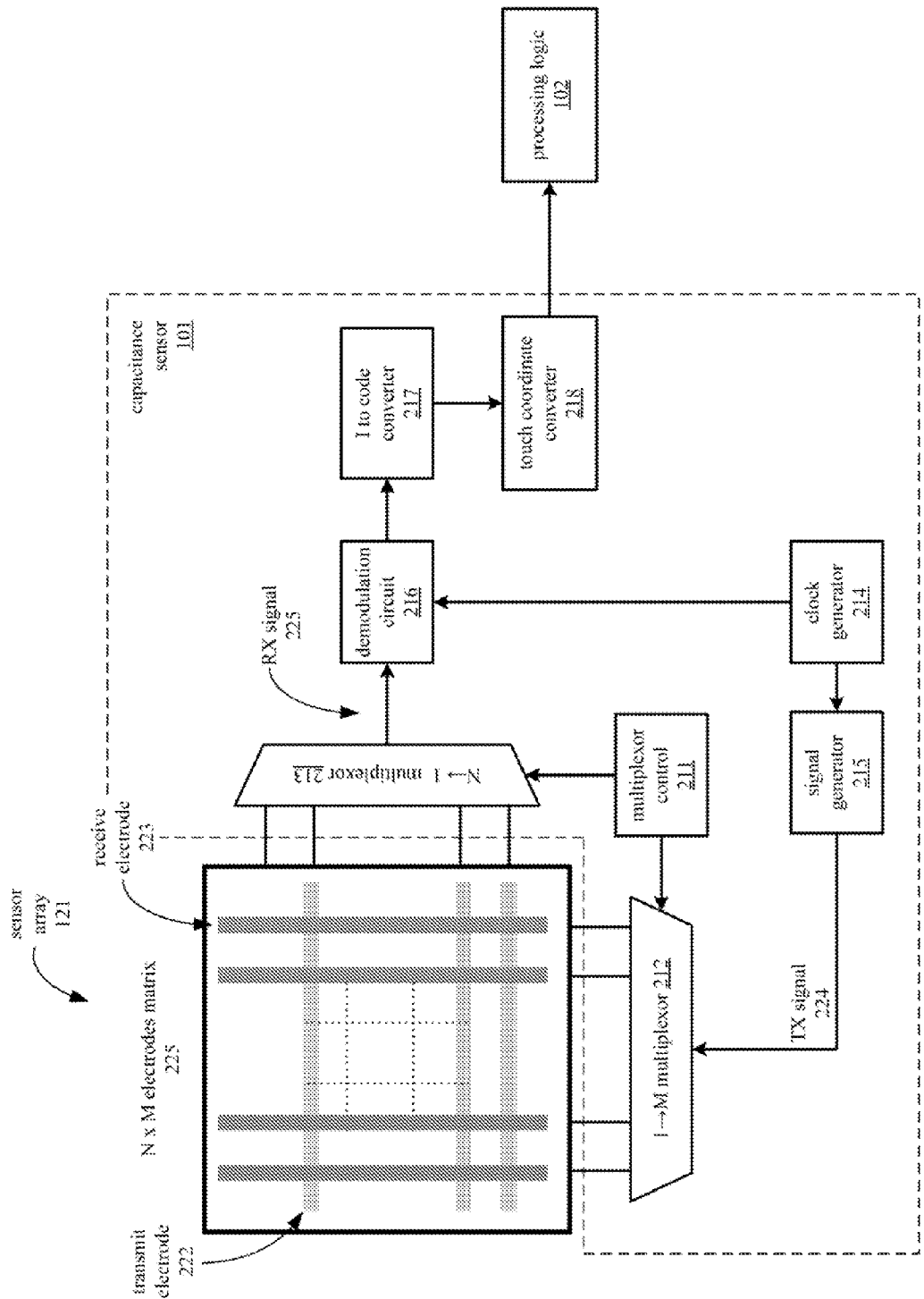
FIG. 2A illustrates a block diagram of an embodiment of an electronic system that processes touch sensor data.

FIG. 2A is a block diagram illustrating one embodiment of a capacitive touch sensor array 121 and a capacitance sensor 101 that converts measured capacitances to coordinates. The coordinates are calculated based on measured capacitances. In one embodiment, sensor array 121 and capacitance sensor 101 are implemented in a system such as electronic system 100. Sensor array 220 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 201 through multiplexers 212 and 213.

Capacitance sensor 101 includes multiplexer control 211, multiplexers 212 and 213, clock generator 214, signal generator 215, demodulation circuit 216, and analog to digital converter (ADC) 217. ADC 217 is further coupled with touch coordinate converter 218. Touch coordinate converter 218 outputs a signal to the processing logic 102.

The transmit and receive electrodes in the electrode matrix 225 may be arranged so that each of the transmit electrodes overlap and cross each of the receive electrodes such as to form an intersection, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 intersect.

Clock generator 214 supplies a clock signal to signal generator 215, which produces a TX signal 224 to be supplied to the transmit electrodes of touch sensor 220. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with multiplexer 212, which allows the TX signal 224 to be applied to any of the M transmit electrodes of touch sensor 220. In one embodiment, multiplexer control 211 controls multiplexer 212 so that the TX signal 224 is applied to each transmit electrode in a controlled sequence. Multiplexer 212 may also be used to ground, float, or connect an alternate signal to the other transmit electrodes to which the TX signal 224 is not currently being applied.

Because of the capacitive coupling between the transmit and receive electrodes, the TX signal 224 applied to each transmit electrode induces a current within each of the receive electrodes. For instance, when the TX signal 224 is applied to transmit electrode 222 through multiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The capacitance associated with each intersection between a TX electrode and an RX electrode can be sensed by selecting every available combination of TX electrode and an RX electrode using multiplexers 212 and 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When an object, such as a finger, approaches the electrode matrix 225, the object causes a decrease in the mutual capacitance between only some of the electrodes. For example, if a finger is placed near the intersection of transmit electrode 222 and receive electrode 223, the presence of the finger will decrease the mutual capacitance between the two electrodes 222 and 223. Thus, the location of the finger on the touchpad can be determined by identifying the one or more receive electrodes having a decreased mutual capacitance in addition to identifying the transmit electrode to which the TX signal 224 was applied at the time the decreased mutual capacitance was measured on the one or more receive electrodes.

By determining the mutual capacitances associated with each intersection of electrodes in the matrix 225 the locations of one or more contacts may be determined. The determination may be sequential, in parallel, or may occur more frequently at commonly used electrodes.

In alternative embodiments, other methods for detecting the presence of a finger or conductive object may be used where the finger or conductive object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

The induced current waveform 227 is rectified by demodulation circuit 216. The rectified current output by demodulation circuit 216 can then be filtered and converted to a digital code by ADC 217.

The digital code is converted to touch coordinates indicating a position of an input on touch sensor array 121 by touch coordinate converter 218. The touch coordinates are transmitted as an input signal to the processing logic 102. In one embodiment, the input signal is received at an input to the processing logic 102. In one embodiment, the input may be configured to receive capacitance measurements indicating a plurality of row coordinates and a plurality of column coordinates. Alternatively, the input may be configured to receive row coordinates and column coordinates.

In one embodiment, the sensor array 121 can be configured to detect multiple touches. One technique for multi-touch detection uses a two-axis implementation: one axis to support rows and another axis to support columns. Additional axes, such as a diagonal axis, implemented on the surface using additional layers, can allow resolution of additional touches.

Figure 2B:
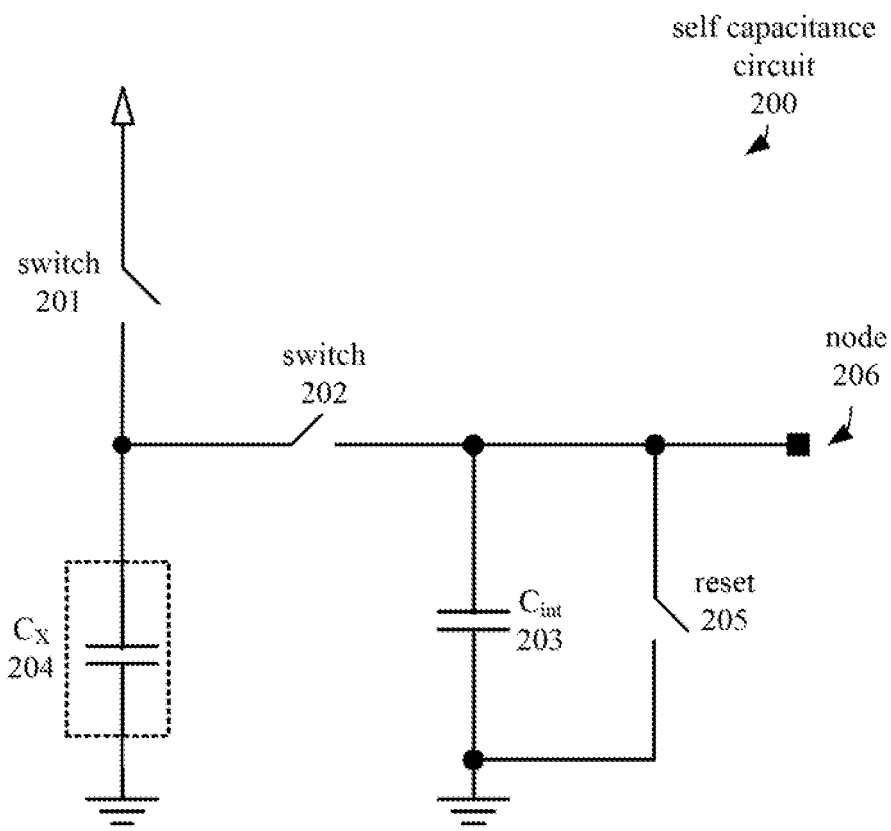
FIG. 2B illustrates a circuit for measuring a self capacitance, according to an embodiment.

While FIG. 2A illustrates a capacitance sensing circuit that measures mutual capacitance between sensor elements, various circuit implementations for performing capacitance measurement may measure self capacitances of each electrode. FIG. 2B illustrates a self-capacitance circuit 200 that uses a charge accumulation technique to measure the capacitance Cx 204. In an embodiment, the capacitance Cx 204 may represent the self capacitance of a sensor element similar to the sensor elements in the electrode matrix 225 of sensor array 121.

A charge accumulation technique operates in the following manner: initially the integration capacitor is reset by turning on the reset switch 205 for some time. After reset, the switches 201 and 202 start operation in two non-overlapping phases. During a first duration of the switching cycle, switch 201 is closed while switch 202 is open so that Cx 204 is charged. During a second duration of the switching cycle, switch 202 is closed while switch 201 is open so that the accumulated charge at Cx 204 is transferred to $C_{int}$ 203. The voltage on $C_{int}$ 203 starts increasing. The sensing capacitance is determined by the number of switching cycles used to cause the voltage of the integrator capacitor $C_{int}$ 203 to reach a threshold value. The voltage at $C_{int}$ 203 may be accessible from node 206, which may be connected to a comparator or other measurement circuit With such a charge accumulation technique, the voltage on the integration capacitance rises exponentially with respect to time (which can be measured by the cycle count). This relationship can be linearized for measurement methods where capacitance is calculated as a function of integration capacitor voltage after a predefined number of cycles. In one embodiment, a self capacitance may be measured during a scan for each of a number of sensor elements in a sensor array having a similar layout as sensor array 121. Since the proximity or contact of an object, such as a finger, changes the self capacitance of a sensor element, the self capacitances of the sensor elements may indicate the location of a contact and may further be used to calculate coordinates for the contact location.

Figure 3:
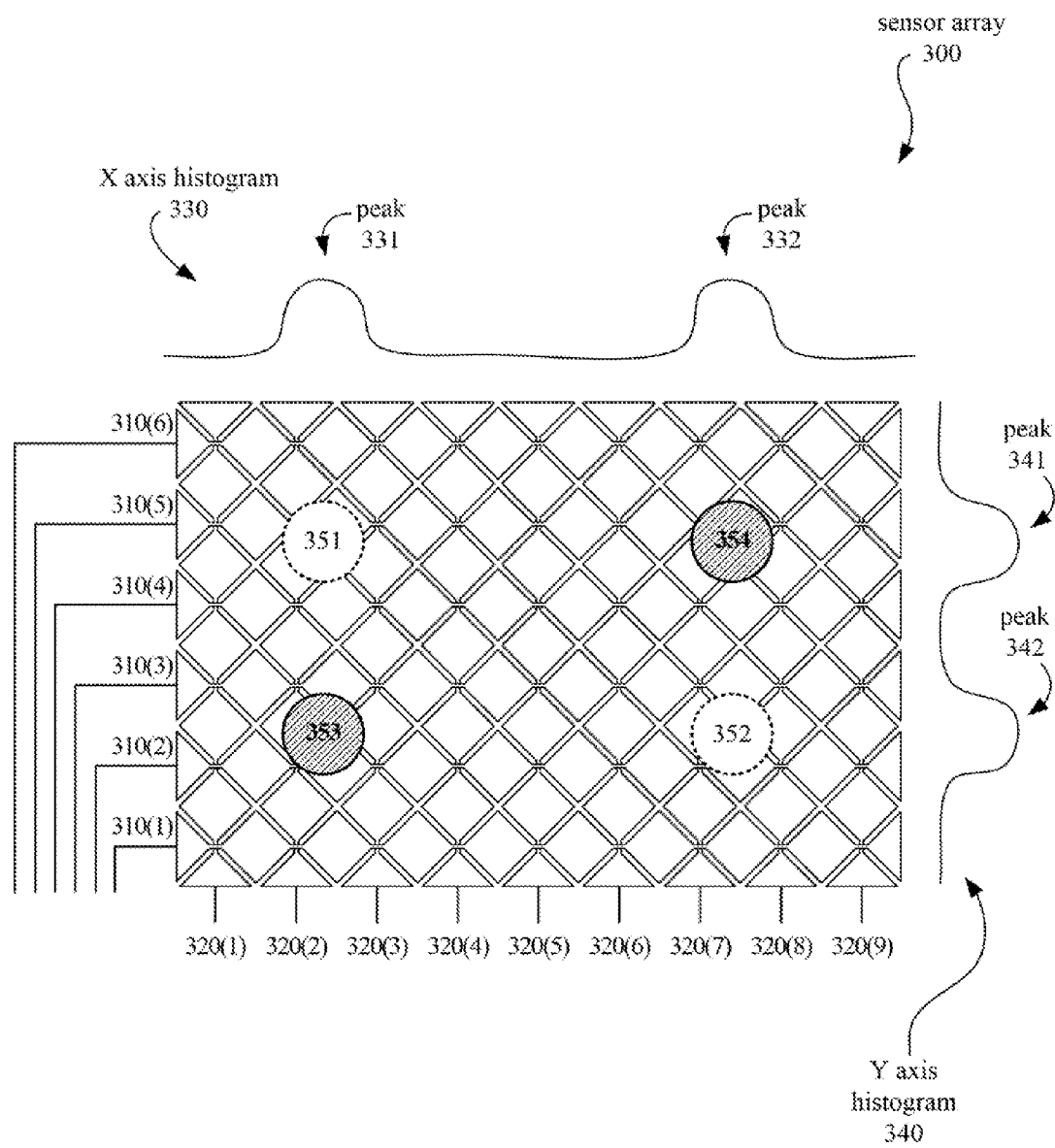
FIG. 3 illustrates one embodiment of a sensor array.

One embodiment of an electronic touch sensing system such as electronic system 100 may be connected to a sensor array such as sensor array 300, illustrated in FIG. 3. The sensor array 300 includes horizontal sensing elements 310(1)-310(6) and vertical sensing elements 320(1)-320(9).

In one embodiment, the touch sensing system scans the sensor array 300 by taking sequential measurements of each sensing element in sequence. For example, the scan may measure the capacitance at each of the sensing elements 310(1)-310(6) in sequential order, and then measure the capacitance at each of the sensing elements 320(1)-320(9) in sequential order. Alternatively, the scan may measure two or more of the sensing elements in parallel. In one embodiment, the result of such a scan may be a histogram 330 for the horizontal (X) and a histogram 340 for the vertical (Y) axis.

The X axis histogram 330 represents the capacitances measured at the vertical sensor elements 320(1)-320(9). Since contacts at the touch sensing surface affect these measured capacitances, the locations of such contacts along the X axis may be represented as peaks in the X axis histogram. For example, if two contacts 351 and 352 are applied to the touch sensing surface, the locations along the X axis of contact 351 and contact 352 are represented as peaks 331 and 332, respectively, in histogram 330.

Similarly, the Y axis histogram 340 represents the capacitances measured at the horizontal sensor elements 310(1)-310(6). Thus, the locations of contacts 351 and 352 along the Y axis are represented as peaks 341 and 342, respectively, in the Y axis histogram 340.

In one embodiment, when only a single contact is applied to the touch sensing surface, the system may determine the location of the single contact based on the X and Y histograms, since the peak of each histogram indicates the row and column locations of the finger contact. However, when multiple contacts are present, the histograms may indicate a number of possible contact locations. For example, when the actual contacts 351 and 352 are applied to the touch sensing surface, the resulting peaks 331, 332, 341, and 342 indicate additional possible touch locations 353 and 354.

For example, whether the two contacts are at locations 351 and 352, or whether the two contacts are at locations 353 and 354, identical histograms may result. When additional actual contacts are added, the number of possible contact locations also increases. For N actual contacts, the resulting histograms may indicate up to $N^2$ possible contact locations.

In order to determine that the contacts 351 and 352 are the actual contact locations from among the possible contact locations 351, 352, 353, and 354, the system may perform an additional resolve scan. In one embodiment, the system may perform a resolve scan of the horizontal or vertical sensor elements corresponding to one or more of the peaks, such as peaks 331, 332, 341, or 342, detected during the initial scan.

In one embodiment of an electronic system that performs a resolve scan for detecting multiple touches, the system begins by performing a standard scan of all row and column sensing elements sequentially or in parallel, using a self capacitance measurement technique. The system performs a resolve scan measuring mutual capacitances when multiple possible contact locations are detected. In one embodiment, if multiple peaks, such as peaks 331 and 332, are detected in the X axis histogram and multiple peaks, such as peaks 341 and 342, are detected in the Y axis histogram, the system performs the resolve scan.

In one embodiment, performing the resolve scan includes scanning a first sensing element corresponding to one of the coordinate locations indicated by a histogram peak along with a second and a third sensing element corresponding to two other coordinate locations indicated by a histogram peak. In one embodiment, the coordinate locations of the second and third sensing elements are indicated by a different histogram than the coordinate location of the first sensing. For example, with reference to FIG. 3, the resolve scan may measure sensor element 320(2) in conjunction with sensor element 310(5), and measure sensor element 320(2) with sensor element 310(2). In this case, peaks 341 and 342 indicate the second and third sensor elements 310(5) and 310(2), respectively, while the first sensor element 320(2) is represented by peak 331.

The system thus conducts a first scan of sensor elements 320(2) and 310(5) and a second scan of sensor elements 320(2) and 310(2). In one embodiment, a count value measured from the first scan will be lower than a count value measured from the second scan because the actual contact is applied at sensor elements 320(2) and 310(5), while no contact is applied at the intersection of sensor elements 320(2) and 310(2). Because the contact is applied near the intersection of elements 320(2) and 310(5), the mutual capacitance between these sensor elements 320(2) and 310(5), and thus the total capacitance, is reduced. The system can then deduce that the actual contacts are located at locations 351 and 352, rather than at 353 and 354.

In one embodiment, this principle of operation may be applied to resolve the actual contact locations of three contacts, with nine possible contact locations. For example, the system may scan five row-column pairs of sensor elements to resolve the three contact locations.

In one embodiment, the count values measured from each of the resolve scans may be compared to each other to determine the location of the actual contact. Alternatively, the resolve scan count values may be compared with the count values measured from the standard scan of all the sensor elements. The system can then determine the actual contact locations based on this comparison.

In one embodiment, the system may perform a resolve scan including more or all of the possible contact locations for higher confidence in the disambiguation. In one embodiment, the resolve scan may have different parameters than the standard scan of all the sensor elements. For example, the resolve scan may be performed using a different scan time or waveform than the standard scan.

In one embodiment, the sensor array may be a capacitive sensor having enhanced sensitivity to changes in mutual capacitance between sensor elements, rather than to changes in self capacitance of each sensor element. In one embodiment, more accurate resolve scan measurements may be obtained by calculating or measuring any capacitance compensation features (such as IDAC settings) and compensating for these capacitance compensation features.

In one embodiment, for purposes of a resolve scan, a histogram peak may indicate two or more sensor elements to be scanned for each axis. For example, peak 342 in the Y axis histogram 340 may indicate sensor elements 310(2) and 310(3) to be scanned with sensor element 320(2) indicated by peak 331. Thus, several adjacent row or column sensor elements can be grouped together for the resolve scan since an object in contact with the touch sensing surface, such as a finger, is likely to couple into more than one of the sensor elements when the contact is applied to the surface.

One embodiment of an electronic system for detecting multiple contacts at a touch sensing surface identifies actual contact locations from the possible contact locations using a difference function. The difference function is used to determine which of a number of possible sets of contact locations represents the set of actual contact locations.

In one embodiment, the difference function is defined by Equation 1 below:

$$Diff = \frac{C_M'^2 - C_M^2}{C_R + (m-1)C_M + C_M'}$$ (Equation 1)

With regard to Equation 1, $C_M$ represents the mutual capacitance at an intersection of a row sensor element and a column sensor element when no contact is present, $C_M'$ represents the mutual capacitance of an intersection when a contact is present, $C_R$ is the parasitic capacitance of a row, and m is the number of columns in the array.

In one embodiment, the magnitude of the difference function is a fraction of the magnitude of an ordinary self capacitance measurement. Thus, for a system that is configured to sense capacitances on the order of $C_M$-$C_M'$, multiple measurements of the difference function can be accumulated to generate a signal that is more readily detectable by the system. For example, in the case where $C_R$=0, the system may acquire m/2 measurements of the difference function.

In one embodiment, the standard scan of the touch sensing array is performed in self capacitance mode, where the self capacitances of each sensor element are measured. For example, for a standard scan in self capacitance mode, a single-ended measurement is performed on a single row or column while all other rows and columns are connected to ground.

In one embodiment, the resolve scan differs from the standard scan in that during the resolve scan, an opposing matrix element is allowed to float during the self capacitance measurement. For example, a row is allowed to float during a column measurement, or a column is allowed to float during a row measurement. In one embodiment, the row and column sensor elements that are floated and measured correspond to histogram peaks, such as peaks 331, 332, 341, and 342, which further correspond to the possible touch locations, such as locations 351, 352, 353, and 354. These are the sensor elements that are most affected by the actual contacts at the touch sensing surface.

One embodiment of an electronic system such as system 100 may include a touch sensor array having n rows and n columns, where all mutual capacitances $C_M$ are equal and all parasitic row capacitances $C_K$ are equal. Such an electronic system may include processing logic, such as processing logic 102 that is configured to detect multiple contacts at a touch sensing surface.

For example, a user may place two fingers of the same hand to the touch sensing surface, and the system may detect the locations of the two fingers. With reference to FIG. 3, the fingers may contact the sensing surface at locations 353 and 354, resulting in peaks 331 and 332 in the X axis histogram 330 and peaks 342 and 341 in the Y axis histogram 340.

In one embodiment, prior to performing the disambiguation process, including the resolve scan, the system may assess the data from the histograms to eliminate special cases where the resolve scan is not needed. For example, if two contacts exist that are aligned in the X or Y directions, the resolve scan is not performed. In this case, the two contacts result in only two possible contact locations because one of the histograms detects only one peak for both contacts. In response to detecting this case, the system determines both of the possible contact locations to be actual contact locations.

In one embodiment, the system may also halt the disambiguation process upon detecting an error. For example, for two contacts, if the number of detected possible contact locations does not equal four or the four possible contact locations do not form a rectangle, the disambiguation process does not proceed and the system may return an error code. The system may similarly return error codes when more actual contacts do not result in the appropriate number of possible contact locations, or if the detected locations of these possible contact locations are not properly aligned.

In one embodiment, the resolve scan of the disambiguation process determines a value of the difference function for a pair of the possible contact locations. In one embodiment, the pair of possible contact locations is aligned in either the X or Y directions. For example, the resolve scan may determine a difference function value using the possible contact locations 352 and 354, which are aligned in the direction of the Y axis.

In one embodiment, the processing logic performing the resolve scan may identify the sensor elements intersecting nearest a first of the possible contact locations. For example, the processing logic 102 may identify sensor elements 310(5) and 320(7) as forming the intersection nearest the possible contact location 354. The processing logic 102, when performing the resolve scan, may float one of these sensing elements while measuring a capacitance at the other of the sensing elements. For example, sensor element 310(5) may be floated while a capacitance at sensor element 320(7) is measured. The resulting equivalent circuit is illustrated in FIG. 4A.

Figure 4A:
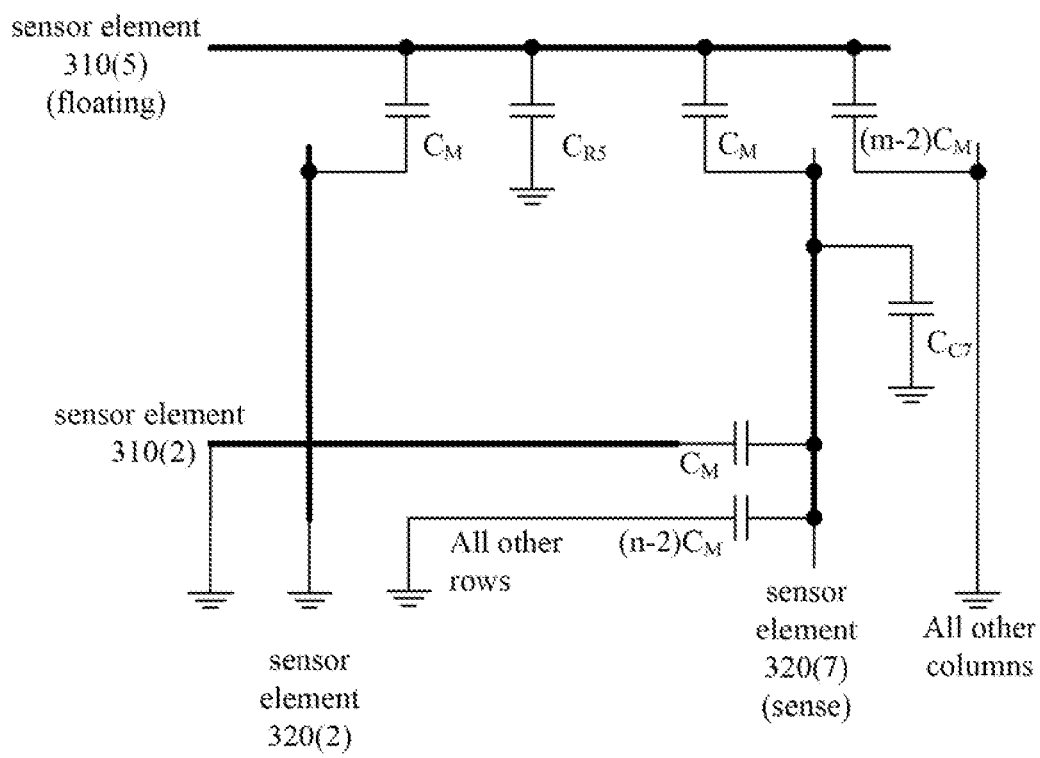
FIG. 4A illustrates an equivalent circuit representing a sensor array, according to one embodiment.

In FIG. 4A, $C_{CX}$ and $C_{RY}$ represent the parasitic capacitances for the sensor elements at column X and row Y, respectively. For example, $C_{R5}$ and $C_{C7}$ in FIG. 4A represent the parasitic capacitances of the sensor element 310(5) at row 5 and sensor element 320(7) at row 7. $C_M$ denotes a mutual capacitance between a column sensor element and a row sensor element. In one embodiment, all of the mutual capacitances $C_M$ are assumed to be equal.

The combined mutual capacitances of the row sensor elements are represented in FIG. 4A as a single capacitance having the value $(n-2)C_{N4}$, while the combined mutual capacitances of the column sensor elements is represented as a single capacitance $(m-2)C_M$.

The magnitude of the mutual capacitance $C_M$ between a given row sensor element and column sensor element is changed by the proximity of a finger or other conductive object near the intersection of the row sensor element and the column sensor element, which may be detected as a contact. In the following equations, $C_M'$ denotes the mutual capacitance resulting from such a contact. Note that in one embodiment, the standard scanning measurement is designed to detect the value $C_M - C_M'$.

Figure 4B:
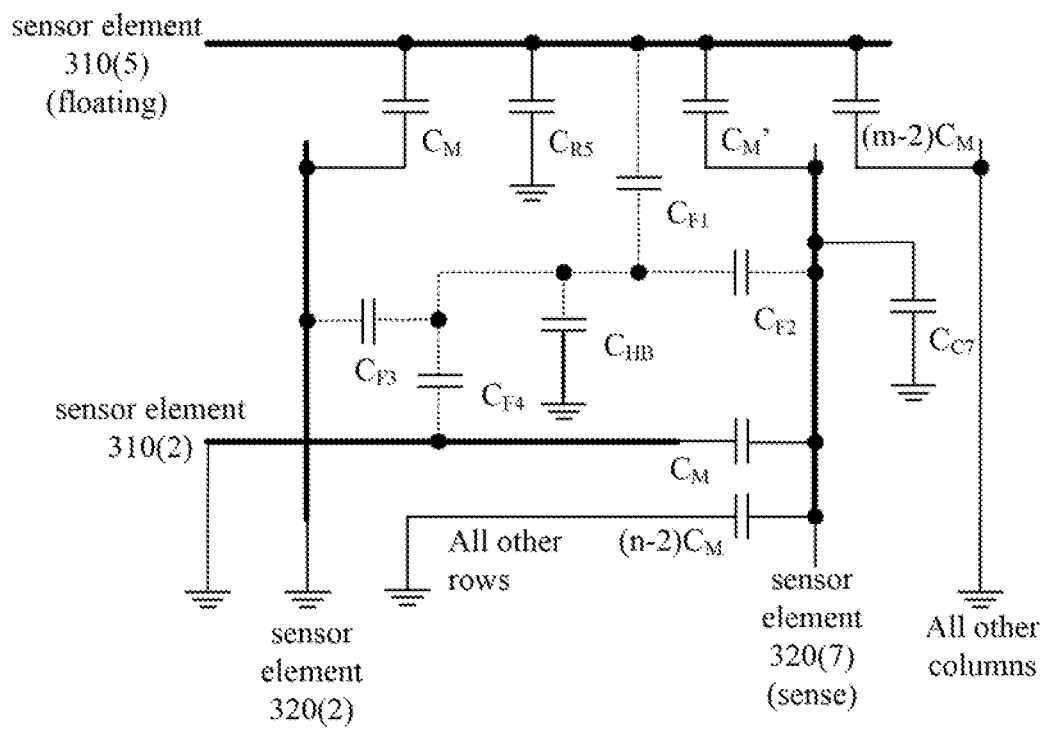
FIG. 4B illustrates an equivalent circuit representing a sensor array with contacts applied, according to one embodiment.

FIG. 4B illustrates an equivalent circuit including elements of the touch sensor array when two contacts are applied to the touch sensing surface at locations 353 and 354. Where the actual contacts are applied by two fingers of the same hand, for example, each finger forms a capacitance, $C_{FX}$, between itself and the nearest row and column elements. For example, for a finger contact at location 354, $C_{F1}$ and $C_{F2}$ are capacitances formed between the finger and sensor elements 310(5) and 320(7), respectively. For the finger contact at location 353, $C_{F3}$ and $C_{F4}$ are capacitances formed between the finger and sensor elements 320(2) and 310(2), respectively. The capacitance $C_{HB}$ represents the capacitance between the human body and ground.

The $C_{FX}$ capacitances are provided a conductive path through each finger and, by extension, through the hand. Each $C_{FX}$ capacitance is assumed to be unique as its value is a function of both finger diameter and position. In one embodiment, the $C_{FX}$ values are on the order of approximately 100 fF, while the capacitance $C_{HB}$ between the human body and ground is approximately 140 pF.

As compared to the circuit of FIG. 4A, the mutual capacitance of FIG. 4B between sensor elements 310(5) and 320(2) is $C_M'$ rather than $C_M$ because a finger contact is present at location 351. The mutual capacitance between sensor elements 310(2) and 320(7) is also affected by a finger, but it is not shown as both of its associated sensor elements are shorted to ground.

Figure 5:
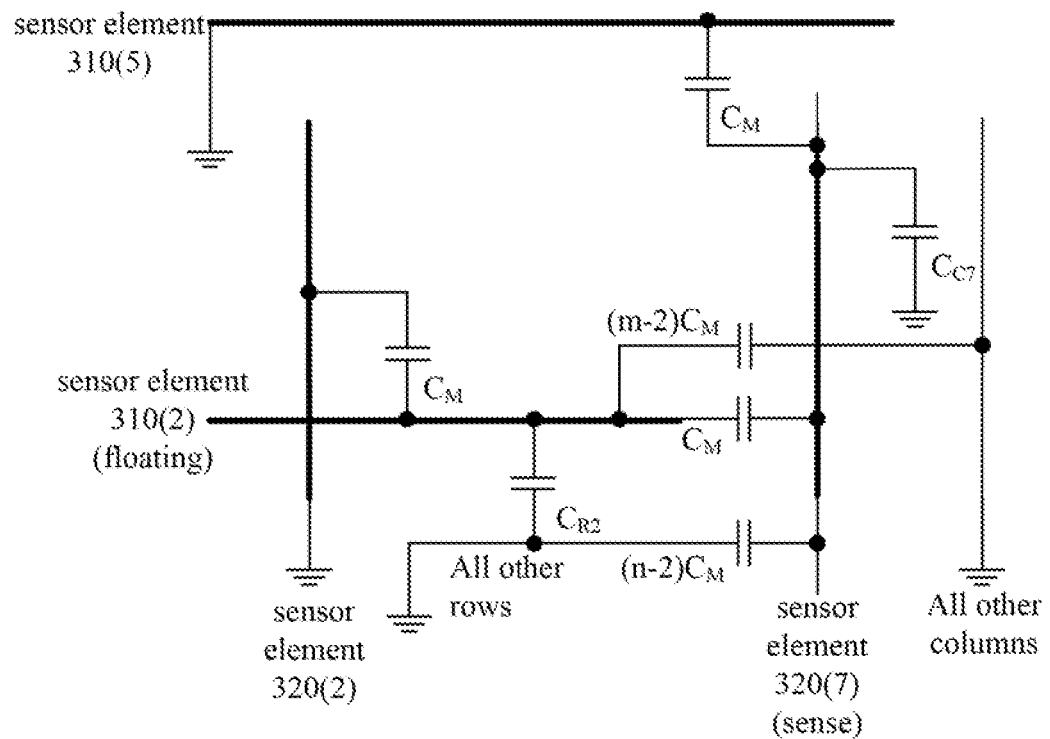
FIG. 5 illustrates an equivalent circuit representing a sensor array, according to one embodiment.

In addition to measuring the capacitance at sensor element 320(7) while floating the sensor element 310(5), the system also measures the capacitance of sensor element 320(7) while floating sensor element 310(2). FIG. 5 illustrates an equivalent circuit for this measurement.

According to the circuit illustrated in FIG. 5, the capacitance is measured at sensor element 320(7) while sensor element 310(2) is allowed to float and the remaining row and column sensor elements are grounded. The measurement proceeds in similar fashion as the measurement of the capacitance of sensor element 320(7) while sensor element 310(5) is allowed to float, as described with reference to FIG. 4B.

Figure 6A:
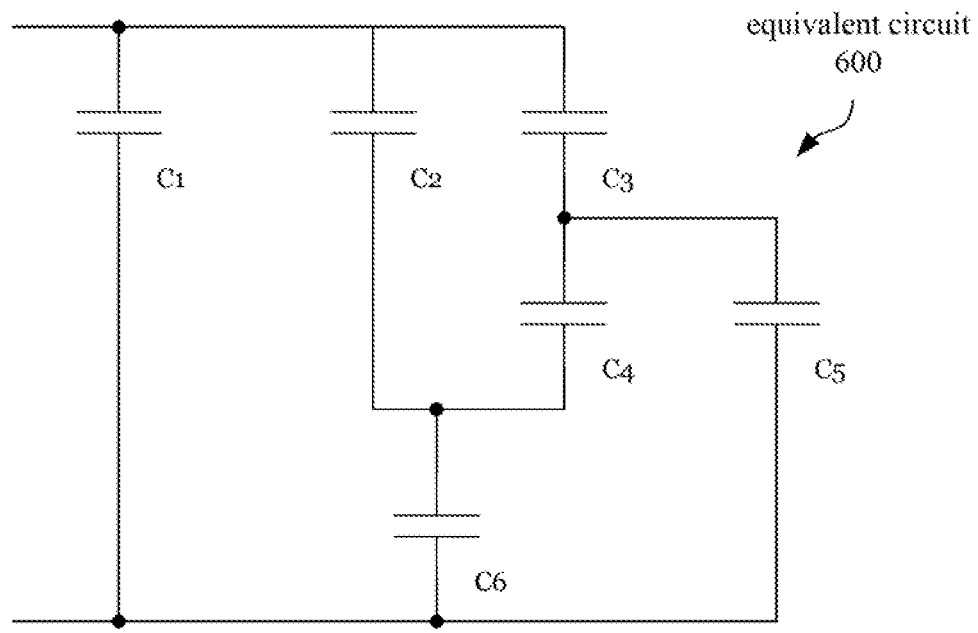
FIG. 6A illustrates an equivalent circuit of a sensor array, according to one embodiment.

The two measurements and two possible sets of contact locations result in four possible circuits, each having the topology of the equivalent circuit 600 illustrated in FIG. 6A.

Table 1 lists the possible capacitance values for the circuit of FIG. 6.

TABLE 1

| Test | Finger Positions | C1 | C2 | C3 | C4 | C5 | C6 |
|---|---|---|---|---|---|---|---|
| 1 | 353, 354 | $C_{C7} +$ $(n-1)C_M$ | $C_M'$ | $C_{F2}$ | $C_{F1}$ | $C_{HB} +$ $C_{F3} + C_{F4}$ | $C_{R5} + (m-1)C_M$ |
| 1 | 351, 352 | $C_{C7} + (n-2)C_M + C_M'$ | $C_M$ | $C_{F1}$ | $C_{F3}$ | $C_{HB} +$ $C_{F2} + C_{F4}$ | $C_{R5} + (m-2)C_M + C_M'$ |
| 2 | 353, 354 | $C_{C7} + (n-2)C_M + C_M'$ | $C_M$ | $C_{F2}$ | $C_{F4}$ | $C_{HB} +$ $C_{F1} + C_{F3}$ | $C_{R2} + (m-2)C_M + C_M'$ |
| 2 | 351,352 | $C_{C7} +$ $(n-1)C_M$ | $C_M'$ | $C_{F1}$ | $C_{F2}$ | $C_{HB} +$ $C_{F3} + C_{F4}$ | $C_{R2} +$ $(m-1)C_M$ |

In Table 1, Test 1 refers to the measurement of sensor element 320(7) while sensor element 310(5) is allowed to float. Test 2 refers to the measurement of sensor element 320(7) while sensor element 310(2) is allowed to float.

Figure 6B:
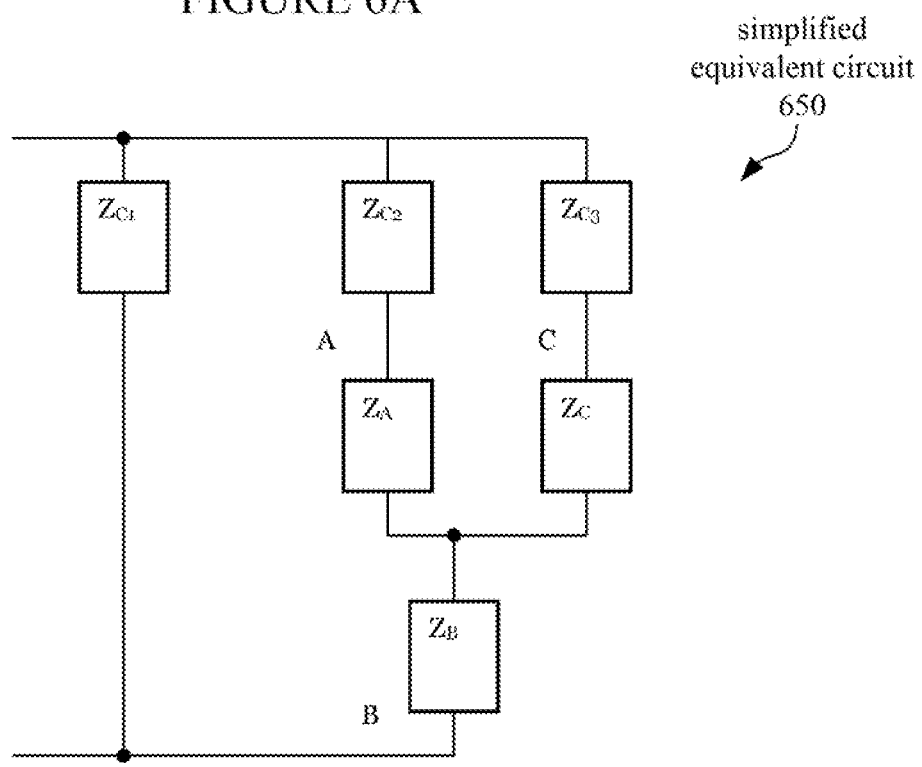
FIG. 6B illustrates an equivalent circuit of a sensor array, according to one embodiment.

The equivalent capacitance of the circuit 600 can be found by substituting capacitances with impedances ($Z_C = 1/\omega C$) and finding the equivalent impedance. The delta topology formed by capacitances C4, C5, and C6 can be simplified using the delta to star transformation. The simplified equivalent circuit 650 is illustrated in FIG. 6B.

The equivalent capacitance of the circuit 650 can be reduced as follows:

$$Z_A = \frac{\left(\frac{1}{C_4\omega} \times \frac{1}{C_6\omega}\right)}{\left(\frac{1}{C_4\omega} + \frac{1}{C_5\omega} + \frac{1}{C_6\omega}\right)}$$ (Equations 2)

$$Z_A = \frac{C_5}{(C_4C_5 + C_4C_6 + C_5C_6)\omega} = \frac{C_5}{(A)\omega}$$

$$Z_B = \frac{C_4}{(A)\omega}$$

$$Z_C = \frac{C_6}{(A)\omega}$$

$$A \equiv C_4C_5 + C_4C_6 + C_5C_6$$

Finding $R_{EQ}$, where $R_{EQ} = (Z_{C2} + Z_A) \| (Z_{C1} + Z_C)$ is accomplished as follows:

$$R_{EQ} = \frac{\left(\frac{1}{C_2\omega} + Z_A\right)\left(\frac{1}{C_3\omega} + Z_C\right)}{\frac{1}{C_2\omega} + \frac{1}{C_3\omega} + Z_A + Z_C}$$ (Equation 3)

$$R_{EQ} = \frac{\frac{A+C_2C_5}{C_2A} \times \frac{A+C_3C_6}{C_3A} \times \frac{1}{\omega}}{\frac{C_3A+C_2A+C_2C_3C_5+C_2C_3C_6}{C_2C_3A}}$$

$$R_{EQ} = \frac{\frac{(A+C_2C_5)(A+C_3C_6)}{A\omega}}{(C_3A+C_2A+C_2C_3C_5+C_2C_3C_6)}$$

$$R_{EQ} = \frac{(A^2+C_2C_5A+C_3C_6A+C_2C_3C_5C_6)\times A^{-1}}{(C_3A+C_2A+C_2C_3C_5+C_2C_3C_6)\omega}$$

$$R_{EQ} = \frac{(A+C_2C_5+C_3C_6+C_2C_3C_5C_6A^{-1})}{(C_3A+C_2A+C_2C_3C_5+C_2C_3C_6)\omega}$$

Finding $R_{EQ}'$, where $R_{EQ}'=Z_B+R_{EQ}$ is accomplished as follows:

$$R_{EQ} = \frac{C_4}{(A)\omega} + \frac{(A+C_2C_5+C_3C_6+C_2C_3C_5C_6A^{-1})}{(C_3A+C_2A+C_2C_3C_5+C_2C_3C_6)\omega} \quad \text{(Equations 4)}$$

$$C_{EQ}' = \frac{1}{R_{EQ}'\omega} = \frac{\omega}{\frac{C_4}{(A)\omega} + \frac{(A+C_2C_5+C_3C_6+C_2C_3C_5C_6A^{-1})}{(C_3A+C_2A+C_2C_3C_5+C_2C_3C_6)\omega}}$$

$$C_{EQ}' = \frac{A(C_3A+C_2A+C_2C_3C_5+C_2C_3C_6)}{C_4(C_3A+C_2A+C_2C_3C_5+C_2C_3C_6)+A(A+C_2C_5+C_3C_6+C_2C_3C_5C_6A^{-1})}$$

$$C_{EQ}' = \frac{(C_2+C_3)A^2+C_2C_3C_5A+C_2C_3C_6A}{A^2+A(C_2C_4+C_3C_4+C_3C_6+C_2C_5)+C_2C_3C_4C_5+C_2C_3C_4C_6+C_2C_3C_5C_6}$$

$$C_{EQ}' = \frac{(C_2+C_3)A^2+C_2C_3C_5A+C_2C_3C_6A}{A^2+A(C_2C_4+C_3C_4+C_3C_6+C_2C_5)+AC_2C_3}$$

$$C_{EQ}' = \frac{(C_2+C_3)A+C_2C_3C_5A+C_2C_3C_6}{A+C_2C_4+C_3C_4+C_3C_6+C_2C_5+C_2C_3}$$

$$C_{EQ}' = \frac{C_2C_3C_6}{\begin{array}{c}(C_2+C_3)(C_4C_5+C_4C_6+C_5C_6)+C_2C_3C_5+\\ C_2C_3+C_2C_4+C_2C_5+C_3C_4+\\ C_3C_6+C_4C_5+C_4C_6+C_5C_6\end{array}}$$

$$C_{EQ}' = \frac{\begin{array}{c}C_2C_3C_5+C_2C_3C_6+C_2C_4C_5+C_2C_4C_6+\\ C_2C_5C_6+C_3C_4C_5+C_3C_4C_6+C_3C_5C_6\end{array}}{\begin{array}{c}C_2C_3+C_2C_4+C_2C_5+C_3C_4+\\ C_3C_6+C_4C_5+C_4C_6+C_5C_6\end{array}}$$

Starting with the equation for $C_{EQ}'$, the following general relationships can be used to simplify the equation for the measurement:

$$C_{HB} \gg C_M, C_{C7}, C_{R5} \gg C_F$$

$$C_5 \gg C_1, C_2, C_6 \gg C_3, C_4 \quad \text{(Equations 5)}$$

Using Equations 5 and Equations 4, the total capacitance can be simplified as follows:

$$C_{EQ}' = \frac{\begin{array}{c}C_2C_3C_5+C_2C_3C_6+C_2C_4C_5+C_2C_4C_6+\\ C_2C_5C_6+C_3C_4C_5+C_3C_4C_6+C_3C_5C_6\end{array}}{\begin{array}{c}C_2C_3+C_2C_4+C_2C_5+C_3C_4+C_3C_6+\\ C_4C_5+C_4C_6+C_5C_6\end{array}} \quad \text{(Equations 6)}$$

$$C_{EQ}' \cong \left.\frac{\begin{array}{c}C_2C_3C_5+C_2C_3C_6+C_2C_4C_5+\\ C_2C_4C_6+C_2C_5C_6+C_3C_5C_6\end{array}}{C_2C_5+C_5C_6}\right|_{C_3C_x\cdot C_4C_x=0}$$

$$C_{EQ}' \cong \frac{C_2C_3+C_2C_4+C_2C_6+C_3C_6}{C_2+C_6} + \frac{C_2C_3C_6+C_2C_4C_6}{C_5(C_2+C_6)}$$

$$C_{EQ}' \cong C_3 + \frac{C_2C_6}{C_2+C_6} \times \left(1+\frac{C_3+C_4}{C_5}\right) + \frac{C_2C_4}{C_2+C_6}$$

$$C_{EQ}' \cong C_3 + \frac{C_2C_6}{C_2+C_6} + \frac{C_2C_4}{C_2+C_6} \left|\frac{c_3+c_4}{c_5}=0\right.$$

$$C_{Total} \cong C_1 + C_3 + \frac{C_2C_6}{C_2+C_6} + \frac{C_2C_4}{C_2+C_6}$$

The value of the difference function is determined by subtracting the results for Test 1 (float element 310(5) while measuring element 320(7)) and Test 2 (float element 310(2) while measuring element 320(7)). The difference function is expressed as Equation 7 below:

$$\text{Diff} = C_{Total}(\text{Test 1}) - C_{Total}(\text{Test 2}) \quad \text{(Equation 7)}$$

Assuming that the row capacitances $C_{RX}$ are equal and ignoring the $C_MC_F$ terms for simplicity, the difference function can be solved as follows for the case where the actual contacts are at locations 353 and 354:

$$Diff_A = C_{C7} + (n-1)C_M - (C_{C7} + (n-2)C_M + C_M') + \quad \text{(Equations 8)}$$
$$(C_{F2}-C_{F2}) + C_M'(C_{F1}+C_R+(m-1)C_M) - \frac{C_M(C_{F4}+C_R+(m-2)C_M+C_M')}{C_R+(m-1)C_M+C_M'}$$

$$Diff_A = (C_M - C_M') + \frac{C_M'(C_{F1}+C_R+(m-2)C_M) - C_M(C_{F4}+C_R+(m-2)C_M)}{C_R+(m-1)C_M+C_M'}$$

$$Diff_A = (C_M - C_M') - \frac{(C_M - C_M')(C_R+(m-2)C_M)}{C_R+(m-1)C_M+C_M'}$$

$$Diff_A = (C_M - C_M')\left[1 - \frac{(C_R+(m-2)C_M)}{C_R+(m-1)C_M+C_M'}\right]$$

$$Diff_A = (C_M - C_M')\left[\frac{C_M+C_M'}{C_R+(m-1)C_M+C_M'}\right]$$

$$Diff_A = \frac{C_M^2 - C_M'^2}{C_R+(m-1)C_M+C_M'}$$

The difference function can be solved as follows for the alternate case where the actual contacts are at locations 351 and 352:

$$Diff_B = C_{C7} + (n-2)C_M + C_M' - (C_{C7}+(n-1)C_M) + \quad \text{(Equations 9)}$$
$$(C_{F1}-C_{F1}) + C_M(C_{F3}+C_R+(m-2)C_M+C_M') - \frac{C_M'(C_{F2}+C_R+(m-1)C_M)}{C_R+(m-1)C_M+C_M'}$$

$$Diff_B = (C_M' - C_M) + \frac{C_M(C_{F3}+C_R+(m-2)C_M) - C_M'(C_{F2}+C_R+(m-2)C_M)}{C_R+(m-1)C_M+C_M'}$$

$$Diff_B = (C_M' - C_M)\left[1 - \frac{(C_R+(m-2)C_M)}{C_R+(m-1)C_M+C_M'}\right]$$

-continued $$Diff_B = (C'_M - C_M)\left[\frac{C'_M + C_M}{C_R + (m-1)C_M + C'_M}\right]$$

$$Diff_B = \frac{C'^2_M - C^2_M}{C_R + (m-1)C_M + C'_M}$$

Since $C_M > C'_M$ and $Diff_A > 0 > Diff_B$, the locations of the actual contacts can be inferred by finding the sign of the difference function. In one embodiment, the difference function can be maximized by maximizing $C_M$ and minimizing $C_R$. If $C_R$ is 0, then the difference function can be represented as:

$$Diff_A \cong \frac{(C_M - C'_M)^2}{mC_M} \quad \text{(Equation 10)}$$

In one embodiment, the difference function may be maximized by accumulating the difference function across multiple samples to reduce noise and create a higher effective signal-to-noise ratio (SNR). Empirically, $C'_M$ is approximately equal to 0.9 $C_M$, so the difference function can be approximated as follows:

$$C_M - C'_M = 0.1 C_M \quad \text{(Equations 11)}$$

$$Diff_A \cong \frac{0.8 C_M}{m}$$

In one embodiment, m/2 measurements of the difference function may be taken to yield an accumulated signal level on the same order as an ordinary self-capacitance measurement when $C_R=0$.

In one embodiment, the difference function may be maximized by performing Test 1 and Test 2 on the longest element in the array. In this case, the system indirectly drives the sensor element having the least amount of mutual capacitance.

In one embodiment, the resolve scan may be performed as differential self capacitance measurements. In this case, the magnitude of the difference function is the same as for the single-ended mode. However, in one embodiment, the differential measurement may be performed in half the time and may provide better power supply noise immunity.

The differential form of the difference function measurement is performed by measuring a pair of column sensor elements, such as 320(2) and 320(7) simultaneously, and measuring the output currents differentially.

Figure 7A:
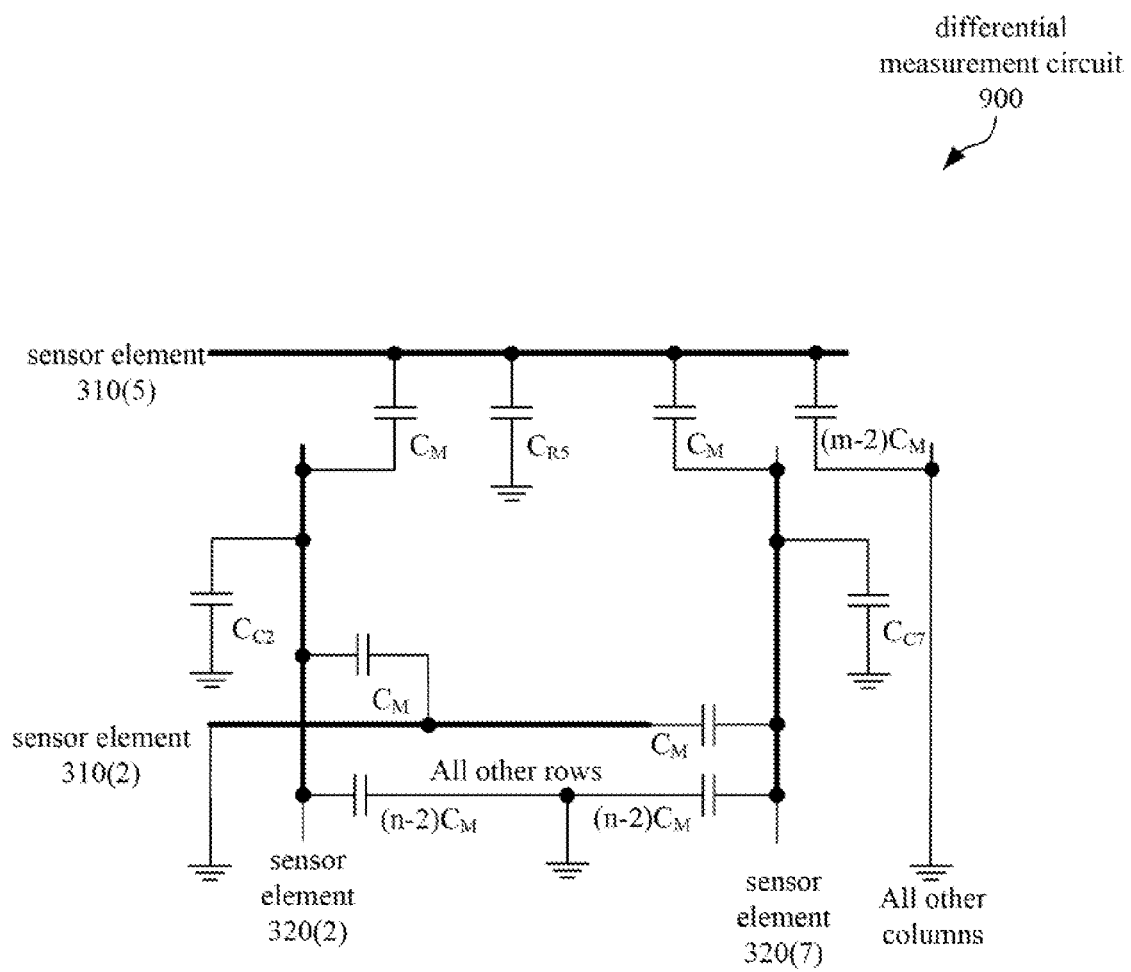
FIG. 7A illustrates an equivalent circuit of a sensor array, according to one embodiment.
Figure 7B:
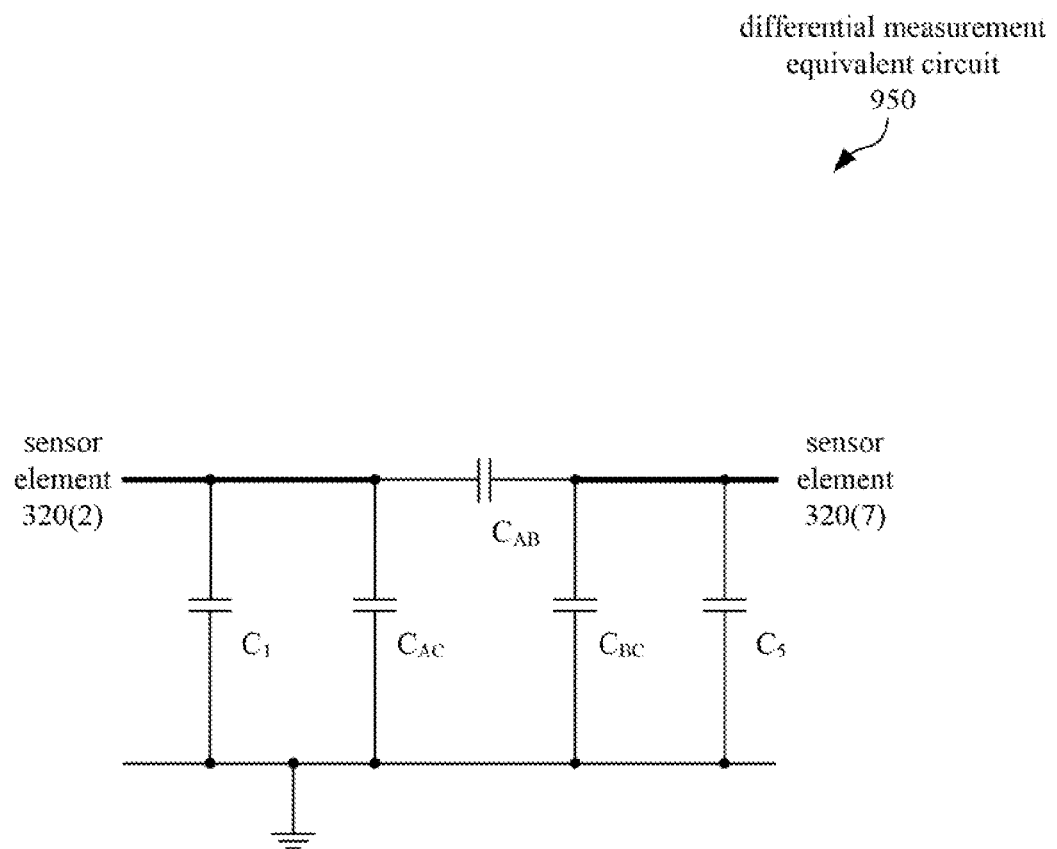
FIG. 7B illustrates an equivalent circuit of a sensor array, according to one embodiment.

FIG. 7A illustrates a circuit 900 illustrating the differential mode measurement. Per the analysis above, $C_F$ and $C_{HB}$ values can be ignored. The difference function measurement is influenced by variations in the mutual capacitance $C_M'$ caused by a contact at the touch sensing surface. The differential measurement circuit 900 can be further simplified into a simplified equivalent circuit using a delta-wye transformation. The simplified differential measurement equivalent circuit 950 is illustrated in FIG. 7B.

The values of $C_{AC}$, $C_{BC}$, and $C_{AB}$ are related to the capacitances of FIG. 7A as expressed in Equations 12 and Table 2 below:

$$C_{AC} = \frac{C_2 C_3 C_4}{C_3(C_2 + C_3 + C_4)} \quad \text{(Equations 12)}$$

$$C_{BC} = \frac{C_2 C_3 C_4}{C_2(C_2 + C_3 + C_4)}$$

$$C_{AB} = \frac{C_2 C_3 C_4}{C_4(C_2 + C_3 + C_4)}$$

TABLE 2

| Finger Position | C1 | C2 | C3 | C4 | C5 |
|---|---|---|---|---|---|
| 353, 354 | $C_{C2} + (n-2)$ $C_M + C_{M'}$ | $C_M$ | $C_{M'}$ | $C_{R5} +$ $(m-2)C_M$ | $C_{C7} + (n-1)C_M$ |
| 351, 352 | $C_{C2} + (n-1)C_M C_{M'}$ | $C_M$ | $C_{R5} +$ $(m-2)C_M$ | $C_{C7} + (n-2)C_M +$ $C_{M'}$ |

In one embodiment, both of the column sensor elements 320(2) and 320(7) are driven with the same signal during the differential measurement, such that $C_{AB}$ can be ignored.

With reference to FIG. 7B, the difference function, assuming actual contacts at locations 353 and 354, can be solved as follows in Equations 13:

$$C_{AC} = \frac{C_2 C_3 C_4}{C_3(C_2 + C_3 + C_4)} \quad \text{(Equations 13)}$$

$$= \frac{C_M C'_M (C_{RA} + (m-2)C_M)}{C'_M (C_{RA} + (m-1)C_M + C'_M)}$$

$$C_{Col\_A} = C_1 + C_{AC}$$

$$= C_{CA} + (n-2)C_M + C'_M +$$

$$\frac{C_M(C_{RA} + (m-2)C_M)}{(C_{RA} + (m-1)C_M + C'_M)}$$

$$C_{BC} = \frac{C_2 C_3 C_4}{C_2(C_2 + C_3 + C_4)}$$

$$= \frac{C_M C'_M (C_{RA} + (m-2)C_M)}{C_M (C_{RA} + (m-1)C_M + C'_M)}$$

$$C_{Col\_B} = C_5 + C_{BC}$$

$$= C_{CB} + (n-1)C_M + \frac{C'_M(C_{RA} + (m-2)C_M)}{(C_{RA} + (m-1)C_M + C'_M)}$$

$$Diff_A = C_{Col\_B} - C_{Col\_A}$$

$$= (C_{CA} - C_{CB}) + (C_M - C'_M) +$$

$$\frac{(C'_M - C_M)(C_{RA} + (m-2)C_M)}{C_{RA} + (m-1)C_M + C'_M}$$

$$Diff_A = (C_{CB} - C_{CA}) +$$

$$(C_M - C'_M)\left[1 - \frac{(C_{RA} + (m-2)C_M)}{C_{RA} + (m-1)C_M + C'_M}\right]$$

$$Diff_A = (C_M - C'_M)\left[1 - \frac{(C_{RA} + (m-2)C_M)}{C_{RA} + (m-1)C_M + C'_M}\right] \| C_{CA}$$

$$= C_{CB}$$

$$Diff_A \cong (C_M - C'_M)\left[\frac{C_{RA} + (m-1)C_M + C'_M -}{C_{RA} + (m-1)C_M + C'_M}\right]$$

$$Diff_A \cong (C_M - C'_M)\left[\frac{C_M + C'_M}{C_{RA} + (m-1)C_M + C'_M}\right]$$

$$Diff_A \cong \frac{C^2_M - C'^2_M}{C_{RA} + (m-1)C_M + C'_M}$$

The difference function, assuming actual contacts at locations 351 and 352, can be solved as follows in Equations 14:

$$C_{AC} = \frac{C_2 C_3 C_4}{C_3(C_2 + C_3 + C_4)} \quad \text{(Equations 14)}$$

$$= \frac{C_M C'_M (C_{RA} + (m-2)C_M)}{C_M (C_{RA} + (m-1)C_M + C'_M)}$$

$$C_{Col\_A} = C_1 + C_{AC}$$

$$= C_{CA} + (n-1)C_M + \frac{C'_M (C_{RA} + (m-2)C_M)}{(C_{RA} + (m-1)C_M + C'_M)}$$

$$C_{BC} = \frac{C_2 C_3 C_4}{C_2(C_2 + C_3 + C_4)}$$

$$= \frac{C_M C'_M (C_{RA} + (m-2)C_M)}{C'_M (C_{RA} + (m-1)C_M + C'_M)}$$

$$C_{Col\_B} = C_5 + C_{BC}$$

$$= C_{CB} + (n-2)C_M + C'_M \frac{C_M (C_{RA} + (m-2)C_M)}{(C_{RA} + (m-1)C_M + C'_M)}$$

$$Diff_B = C_{Col\_B} - C_{Col\_A}$$

$$= (C_{CB} - C_{CA}) + (C'_M - C_M) + \frac{(C_M - C'_M)(C_{RA} + (m-2)C_M)}{C_{RA} + (m-1)C_M + C'_M}$$

$$Diff_B = (C_{CA} - C_{CB}) + (C'_M - C_M)\left[1 - \frac{(C_{RA} + (m-2)C_M)}{C_{RA} + (m-1)C_M + C'_M}\right]$$

$$Diff_B = (C'_M - C_M)\left[1 - \frac{(C_{RA} + (m-2)C_M)}{C_{RA} + (m-1)C_M + C'_M}\right] | C_{CA}$$

$$= C_{CB}$$

$$Diff_B \cong (C'_M - C_M)\left[\frac{C_M + C'_M}{C_{RA} + (m-1)C_M + C'_M}\right]$$

$$Diff_A \cong \frac{C'^2_M - C^2_M}{C_{RA} + (m-1)C_M + C'_M}$$

As with the case of the single-ended measurement, $Diff_A > 0 > Diff_B$, and set of actual contact locations can be inferred by finding the sign of the difference function. In one embodiment, the magnitude of the difference function is the same whether the differential or single-ended mode is used. Thus, in one embodiment, multiple samples may be used to accumulate a difference function signal having a magnitude that is the same order as an ordinary self capacitance measurement. In one embodiment where $C_R = 0$, m/2 measurements may be accumulated.

As shown in the Diff equation, the greater the row parasitic capacitance, $C_R$, the less the resulting value. In one embodiment, a greater number of repeated measurements is taken to compensate for a higher parasitic row capacitance.

In one embodiment, the system performs the resolve scan on sensor elements other than the sensor elements most affected by the actual contacts at the touch sensing surface. For example, the resolve scan may include taking measurements at row or column sensor elements adjacent to the sensor elements most influenced by the presence of the contacts.

In one embodiment, the parasitic capacitances $C_{CX}$ and $C_{RX}$ may not be exactly equal, resulting in a more complex difference function than described above. The inequality of the parasitic capacitances may result in a shift or offset in the difference function, which may be compensated using calibration.

Figure 8A:
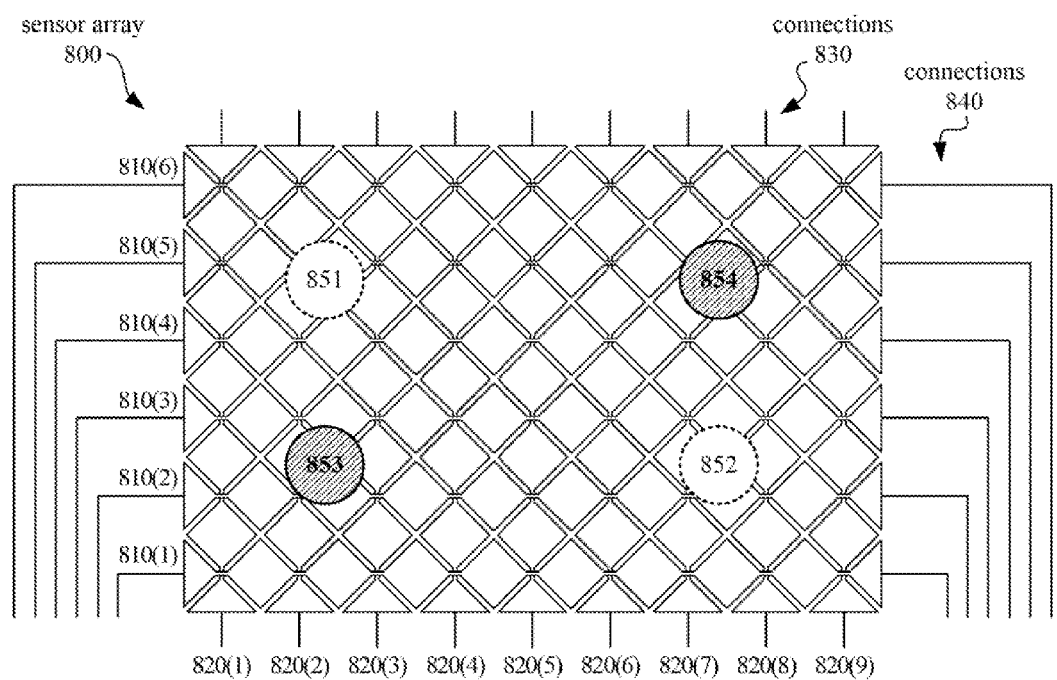
FIG. 8A illustrates one embodiment of a sensor array.

FIG. 8A illustrates an array of sensor elements where each of the sensor elements has connections at both ends. Each of the row sensor elements 810(1)-810(6) in sensor array 800 has connections, such as connections 840, at both ends of the sensor element. Similarly, each of the column sensor elements 820(1)-820(9) has connections, such as connections 830, at both ends of the sensor element.

In an alternative embodiment, only one of the set of row sensor elements or column sensor elements has connections at both ends. For example, the row sensor elements may have connections at both ends while the column sensor elements are connected at one end. Alternatively, the column sensor elements may have connections at both ends while the column sensor elements are connected at one end.

In one embodiment, the sensor array 800 is manufactured from an Indium Tin-Oxide (ITO) material. In one embodiment, only some of the sensor elements in the sensor array have dual connections, defining a limited area in which multiple touch resolution is available.

Figure 8B:
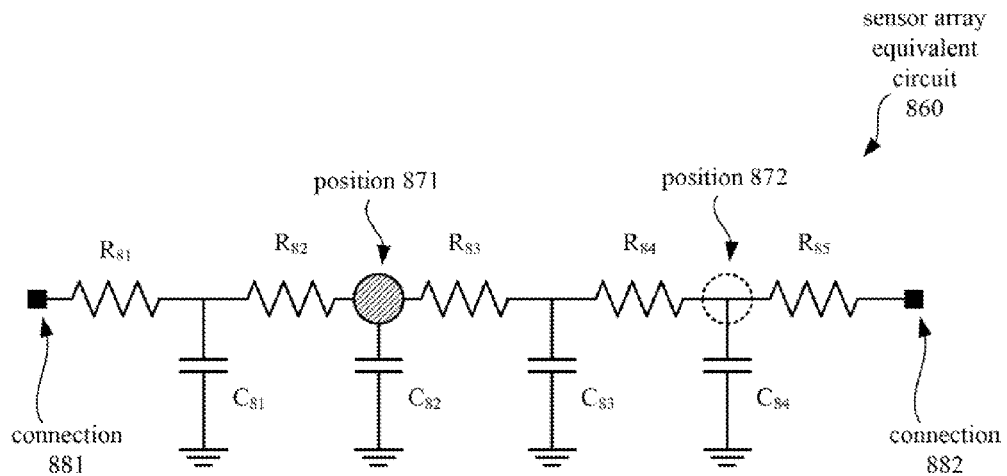
FIG. 8B illustrates an equivalent circuit of a sensor array, according to one embodiment.

FIG. 8B illustrates an equivalent circuit of a sensor element of sensor array 800. The equivalent circuit 860 can be represented as an RC network that is connected at the ends to a connection 881 and a connection 882, representing the connections at the either end of the sensor element, such as connections 830 or 840. In one embodiment, the connections 881 and 882 may be coupled to, for example, capacitance sensor 101 in electronic system 100.

In one embodiment, the response time, represented by a time constant t, and charging amplitude of the RC network is affected by the position of the actual contacts on the sensor element.

For example, assuming that all resistances and all capacitances are equal, such that:

$$R_{81} = R_{82} = \ldots = R_{85} = R$$

$$C_{81} = C_{82} = \ldots = C_{84} = C \quad \text{(Equations 15)}$$

When an actual contact is present at position 871, the difference $\Delta t$ between a time constant $t_{881}$ measurable from connection 881 and a time constant $t_{882}$ measurable from connection 882 can be calculated according to Equations 16, as follows:

$$t_{881} = R_{81} \times C_{81} + (R_{81} + R_{82}) \times C_{82} \quad \text{(Equations 16)}$$

$$t_{882} = R_{85} \times C_{84} + (R_{84} + R_{85}) \times C_{83} + (R_{83} + R_{84} + R_{85}) \times C_{82}$$

$$\Delta t = t_{881} - t_{882} = -3R \times C$$

When an actual contact is present at position 872, the time constant difference at can be calculated according to Equations 17, as follows:

$$t_{881} = R_{81} \times C_{81} + (R_{81} + R_{82}) \times C_{82} + (R_{81} + R_{82} + R_{83}) \times \quad \text{(Equations 17)}$$

$$C_{38} + (R_{81} + R_{82} + R_{83} + R_{84}) \times C_{84}$$

$$t_{882} = R_{85} \times C_{84}$$

$$\Delta t = t_{881} - t_{882} = -9R \times C$$

This difference in $\Delta t$ as shown in Equations 1.6 and Equations 17 demonstrates that the position of the contact along the sensor element can be determined by measuring the time constant from both sides of the RC network of circuit 860. Thus, in one embodiment, disambiguation may be performed using a resolve scan that measures the time constant from both ends of a sensor element affected by a contact. In one embodiment, two or more possible contact locations are present at the scanned sensor element, and the resolve scan identifies which of the possible contact locations is an actual contact location based on the contact position indicated by the time constants.

In one embodiment, the resolve scan is performed by selecting a sensor element at which two or more possible contact locations are present. In one embodiment, the system may select a sensor element that corresponds to a histogram peak of either the row histogram or the column histogram. The system may then scan the sensor element from both ends to determine the time constant difference. Based on the measured time constant difference, the system can determine which of the possible contact locations is an actual contact location.

For example, after performing a standard sequential scan of all the sensor elements the system may detect Y axis histogram peaks at 810(5), 810(2) and X axis histogram peaks at 820(2) and 820(7), resulting from contacts at locations 853 and 854. The system performs a resolve scan to determine the locations of the actual contacts from the possible contact locations 851, 852, 853, and 854.

If the system selects row sensor element 810(5) on which to perform the resolve scan, the system may measure the time constant from the left end of the element 810(5) by connecting the right end to a high impedance, then sensing a switched capacitor current at the left end of the element 810(5). Similarly, the system may measure the time constant from the right end of the element 810(5) by connecting the left end to a high impedance, then sensing a switched capacitor current at the right end of the element 810(5). The left and right ends of the sensor element 810(5) may correspond to connection 881 and connection 882, respectively, of the equivalent circuit 860.

In one embodiment, if the actual contact is closer to the sensing end, the detected value of Δt is larger. Thus, by comparing the Δt values measured from the left and right ends of element 810(5), the system can determine that the actual contact 854 is closer to the right end of sensor element 810(5). From this, the system can further deduce that the other actual contact is at location 853, since histogram peaks are also detected at sensor elements 810(2) and 820(2).

Figure 9:
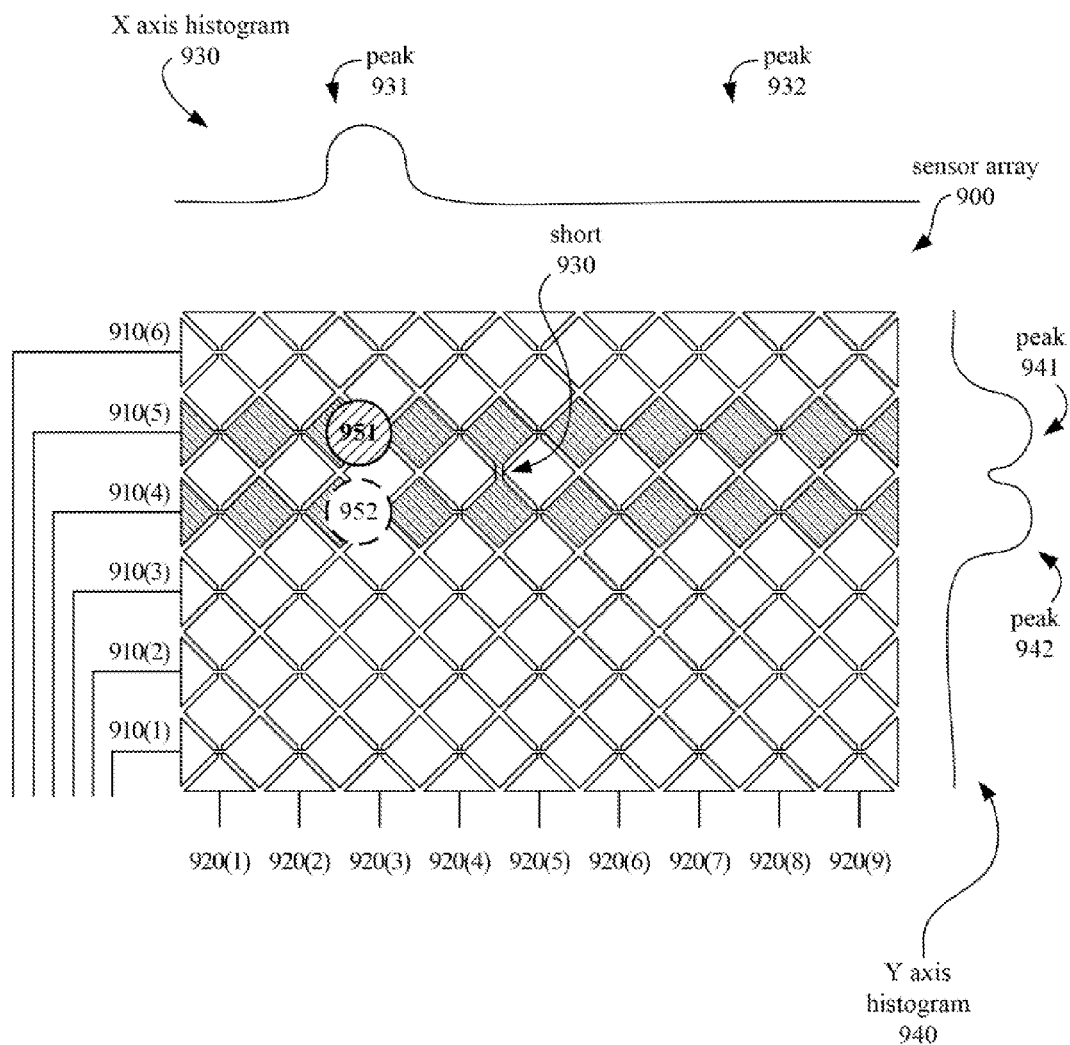
FIG. 9 illustrates one embodiment of a sensor array having a manufacturing defect.

In one embodiment, the resolve scan process described above may be used when detecting a contact on a sensor array having an internal short. FIG. 9 illustrates a sensor array 900 having a short 930 that connects sensor elements 910(5) and 910(4). Short 900 may be caused, for example, by a manufacturing defect.

When a standard scan is performed on the sensor array 900, the resulting X axis histogram 930 includes a peak 931 and the resulting Y axis histogram 940 includes peaks 941 and 942. The peak 942 is detected because of the short 930 and indicates that a contact has been applied to sensor element 910(4) even though the actual contact locations 951 is on sensor element 910(5). The possible contact locations indicated by the histograms 930 and 940 are locations 951 and 952.

In this case, even if the sensor elements 910(5) and 910(4) are not connected at both ends, the left ends of elements 910(5) and 910(4) can be treated as two ends of a single sensor element so that the actual contact location can be identified. Each of the left ends of elements 910(5) and 910(4) may be scanned to measure the time constant difference Δt.

In one embodiment, the detected value of Δt is larger if the actual contact is closer to the sensing end. Thus, based on peak 931 and a comparison of the Δt values measured from the left ends of elements 910(5) and 910(4), the system can determine that the actual contact is closer to the left end of sensor element 910(5), at location 951.

Figure 10:
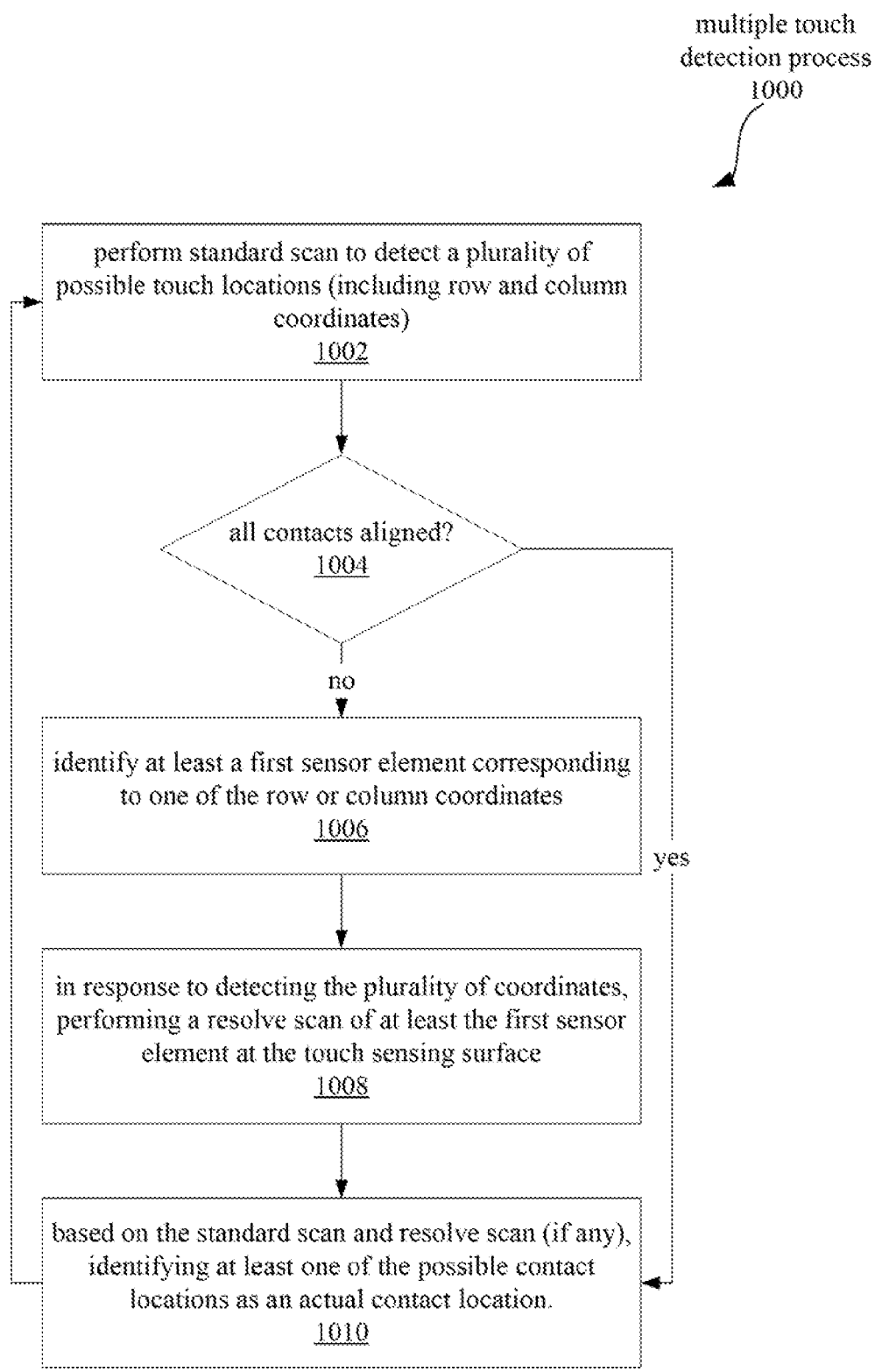
FIG. 10 is a flow diagram illustrating a multiple touch detection process, according to one embodiment.

FIG. 10 illustrates a flow diagram of a multiple touch detection process, according to one embodiment. In one embodiment, multiple touch detection process 1000 may be performed by processing logic 102 of electronic system 100 to detect multiple touches using a sensor arrays such as sensor array 300 or sensor array 800.

At block 1002 of process 1000, the system performs a standard scan to detect a plurality of possible touch locations. In one embodiment, the plurality of possible contact locations may include row and column coordinates. For example, with reference to FIG. 3, the possible contact locations may be designated by coordinates represented by peaks 331 and 332 in the X axis histogram 330 and the peaks 341 and 342 in the Y axis histogram. From block 1002, the process 1000 continues at block 1004.

At block 1004, the system determines whether all the possible contacts are aligned. In one embodiment, the possible contacts are aligned if either the X or Y axis histograms has one peak while the other histogram has more than one peak. If all the contacts are aligned, the process 1000 continues at block 1010. If not all of the contacts are aligned, the process 1000 continues at block 1006.

At block 1006, the system identifies at least a first sensor element corresponding to one of the row or column coordinates detected at block 1002. In one embodiment, the sensor element may be the sensor element that most influences a histogram peak. For example, with reference to FIG. 3, the system may identify row sensor element 310(5) as corresponding to peak 341, or may identify column sensor element 320(2) corresponding to peak 331. From block 1006, the process continues at block 1008.

At block 1008, the system responds to detecting the plurality of coordinates by performing a resolve scan including at least the first sensor element at the touch sensing surface. From block 1008, the process 1000 continues at block 1010.

At block 1010, the system identifies at least one of the possible contact locations as an actual contact location. This identification is based on the standard scan performed at block 1002 and the resolve scan performed at block 1008. In one embodiment, the system may use information from the resolve scan to first identify one of the possible contacts as an actual contact, then deduce the remainder of the actual contacts based on the standard scan coordinates. For example, with reference to FIG. 3, if the system determines that location 353 is an actual contact, the system can then deduce that the other actual contact is at location 354 because of the presence of peaks 332 and 341. In one embodiment, the system may also eliminate the possibility of an actual contact at a particular location. For example, the system may determine based on the resolve scan that an actual contact is not present at location 351 or 352. This determination may also be used to eliminate the possibility that peaks 341 and 332 are caused by actual contacts at locations 351 and 352. From block 1010, the process 1000 continues back to block 1002, according to one embodiment.

The process 1000 may thus repeat execution of blocks 1002-1010 to continuously detect and resolve multiple touches over time.

Figure 11:
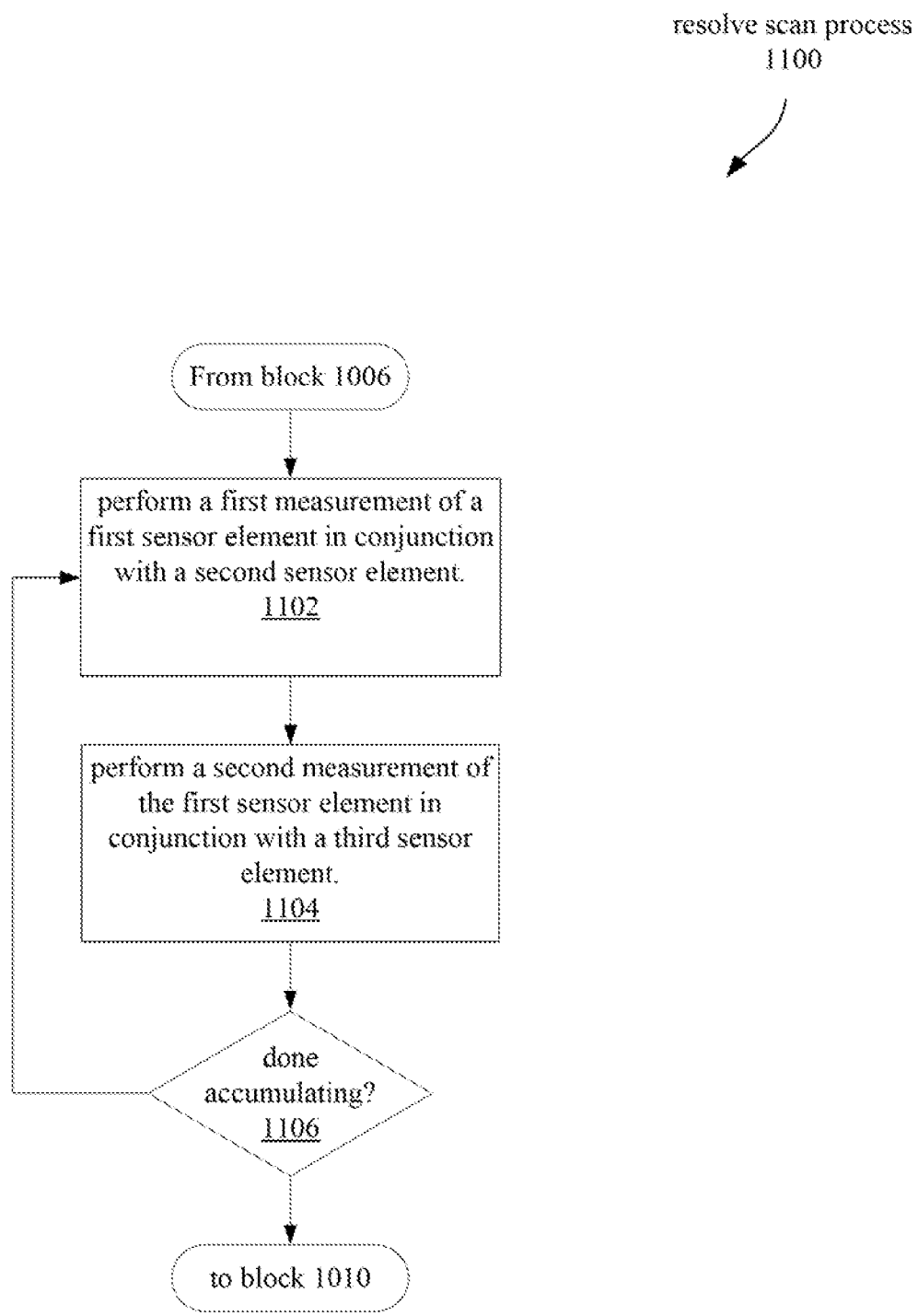
FIG. 11 is a flow diagram illustrating a resolve scan process, according to one embodiment.

FIG. 11 illustrates a flow diagram of a resolve scan process, according to one embodiment. In one embodiment, the resolve scan process corresponds to operations performed at block 1008 of multiple touch detection process 1000.

From block 1006 of process 1000, the resolve scan process 1100 begins at block 1102, where the system performs a first measurement of a first sensor element in conjunction with a second sensor element. In one embodiment, the system may measure a capacitance at the first and second sensor elements, which may be represented as a count value. From block 1102, the process 1100 continues at block 1104.

At block 1104, the system performs a second measurement of the first sensor element in conjunction with a third sensor element. In one embodiment, the system may measure a capacitance at the first and third sensor elements which may be represented as a count value. From block 1104, the process 1100 continues at block 1106.

At block 1106, the system determines whether a sufficient number of measurements of the sensor elements have been accumulated. In one embodiment, if the resolve scan measurements are much smaller in magnitude than the standard scan signals, the resolve scan measurements may be accumulated over several samples to generate a larger signal within a detection range of the system. If, at block 1106, a sufficient number of measurements have been accumulated, the process 1100 continues at block 1010 of process 1000. If, at block 1106, a sufficient number of measurements have not been accumulated, the process 1100 continues back to block 1102.

In one embodiment, the resolve scan process 1100 thus repeats blocks 1102-1106 to accumulate measurements until the magnitude of the resulting accumulated measurement is on the same order as a capacitance measurement of a standard scan.

Figure 12:
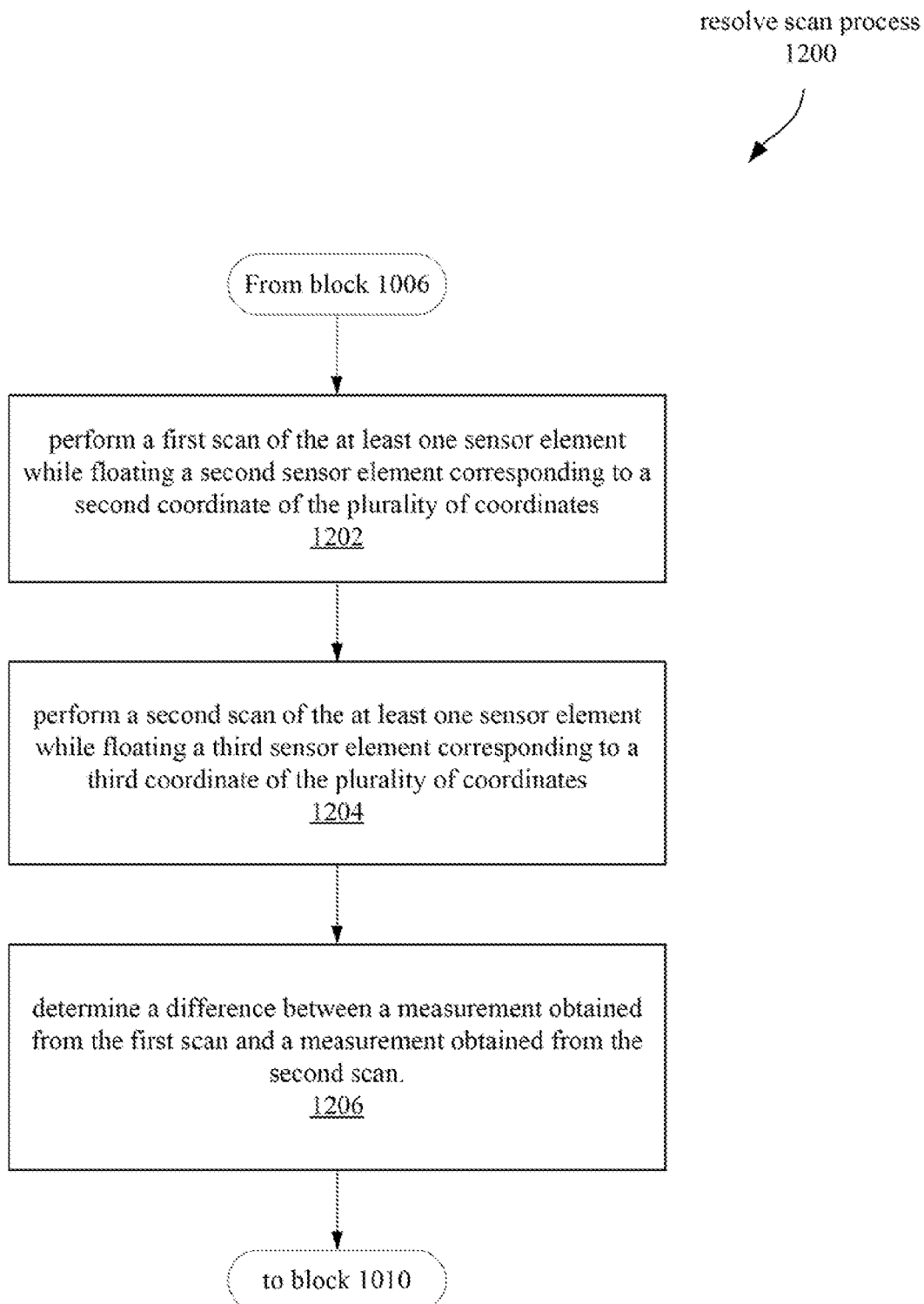
FIG. 12 is a flow diagram illustrating a resolve scan process, according to one embodiment.

FIG. 12 illustrates a flow diagram of a resolve scan process, according to one embodiment. In one embodiment, the resolve scan process corresponds to operations performed at block 1008 of multiple touch detection process 1000.

From block 1006 of process 1000, the resolve scan process 1200 begins at block 1202, where the system performs a first scan of the first sensor element (from block 1006) while floating a second sensor element corresponding to a second coordinate of the coordinates detected at block 1002. For example, with reference to FIG. 4B, the system may sense a capacitance of a first sensor element 320(7) while floating a second sensor element 310(5). The first sensor element 320(7) and the second sensor element 310(5) correspond to peak 332 and peak 341 of FIG. 3, respectively. In one embodiment, the first sensor element intersects the second sensor element. For example, sensor element 320(7) intersects sensor element 310(5) at location 354. From block 1202, the process 1200 continues at block 1204.

At block 1204, the system performs a second scan of the first sensor element (from block 1006) while floating a third sensor element corresponding to a third coordinate of the coordinates detected at block 1002. For example, with reference to FIG. 5, the system may measure a capacitance at the first sensor element 320(7) while floating a third sensor element 310(2). The first sensor element 320(7) and the third sensor element 310(2) correspond to peaks 332 and 342, respectively, of FIG. 3. In one embodiment, the third sensor element intersects the first sensor element, as sensor element 320(7) intersects sensor element 310(2) at location 352 in FIG. 3. In one embodiment, the operations of blocks 1202 and 1204 may be combined into a differential measurement as described above with reference to FIGS. 7A and 7B. From block 1204, the process continues at block 1206.

At block 1206, the system determines a difference between a measurement obtained from the first scan at block 1202 and a measurement obtained from the second scan at block 1204. In one embodiment, the difference may be determined using a difference function such as the difference function of Equation 7. From block 1204, the process 1200 continues at block 1010 of process 1000. In one embodiment, the difference determined at block 1206 is used at block 1010 to identify the actual contact location.

Figure 13:
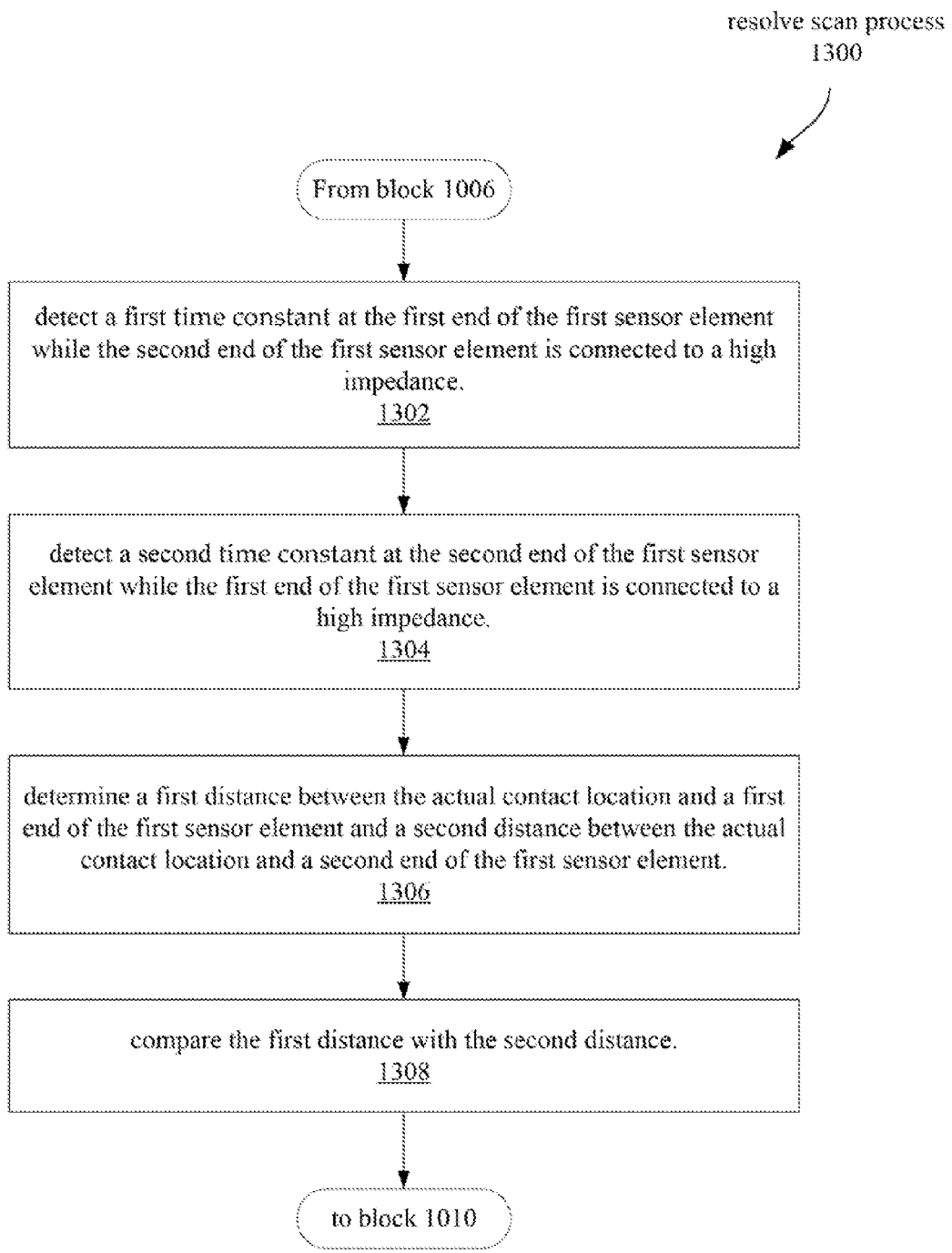
FIG. 13 is a flow diagram illustrating a resolve scan process, according to one embodiment.

FIG. 13 illustrates a flow diagram of a resolve scan process, according to one embodiment. In one embodiment, the resolve scan process corresponds to operations performed at block 1008 of multiple touch detection process 1000. The system may perform the resolve scan process 1300 using a sensor array having sensor elements connected at both ends, such as sensor array 800 illustrated in FIG. 8A.

From block 1006 of process 1000, the resolve scan process 1300 begins at block 1302. At block 1302, the system detects a first time constant at a first end of the first sensor element (from block 1006) while a second end of the first sensor element is connected to a high impedance. For example, with reference to FIG. 8AB, the system may measure the first time constant at the left end of sensor element 810(5) while the right end of sensor element 810(5) is connected to a high impedance. From block 1302, the process 1300 continues at block 1304.

At block 1304, the system detects a second time constant at the second end of the first sensor element while the first end of the first sensor element is connected to a high impedance. For example, with reference to FIG. 8AB, the system may detect the second capacitance at the right end of sensor element 810(5) while the left end of sensor element 810(5) is connected to a high impedance. From block 1304, the process 1300 continues at block 1306.

At block 1306, the system determines a first distance between the actual contact location and a first end of the first sensor element and a second distance between the actual contact location and a second end of the first sensor element. In one embodiment, the first and second distances may correspond to the time constant values determined at blocks 1302 and 1304. From block 1306, the process 1300 continues at block 1308.

At block 1308, the system compares the first distance and the second distance from block 1306. From block 1308, the process continues to block 1010 of process 1000. In one embodiment, the result of the comparison performed at block 1308 is used at block 1010 to identify the actual contact location.

Various embodiments may thus perform the multiple touch detection process 1000 to detect the actual locations of contacts at a touch sensing surface. During the multiple touch detection process 1000, the various embodiments may perform a resolve scan similar to any of resolve scan processes 1100, 1200, or 1300.

Embodiments of the present invention, described herein, include various operations. These operations may be performed by hardware components, software, firmware, or a combination thereof. As used herein, the terms "coupled to" or "coupled with" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
    performing a first scan cycle of a plurality of sensor elements of a touch-sensing surface to detect a plurality of capacitance values indicating a presence of multiple contacts at the touch sensing surface;
    based on the plurality of capacitance values, calculating a plurality of coordinates indicating a plurality of possible contact locations for the multiple contacts;
    in response to detecting that the plurality of coordinates indicates the presence of the multiple contacts, selecting a first intersection of a pair of sensor elements of the plurality of sensor elements, the pair of sensor elements each having capacitance values affected by the presence of at least one of the multiple contacts, wherein the first intersection corresponds to a first possible contact location of the possible contact locations;
    after selecting the first intersection and prior to measuring a capacitance value of any of the plurality of sensor elements having a capacitance value that is unaffected by the presence of the at least one of the multiple contacts, performing a resolve scan cycle of the selected first intersection of sensor elements to measure one or more capacitance values by sensing the selected first intersection; and
    determining whether a second possible contact location different from the first contact location is an actual contact location
        based on the one or more capacitance values measured from the selected first intersection during the resolve scan cycle, and
        prior to sensing an intersection corresponding to the second possible contact location after sensing of the selected first intersection during the resolve scan cycle.

2. The method of claim 1, wherein the plurality of capacitance values comprises a self-capacitance value for each of the plurality of sensor elements, wherein performing the first scan cycle comprises measuring the self-capacitance value for each of the plurality of sensor elements, and wherein performing the resolve scan cycle comprises measuring a mutual capacitance between the sensor elements intersecting at the first intersection.

3. The method of claim 1, wherein performing the resolve scan cycle further comprises measuring a capacitance for a second intersection of sensor elements of the plurality of sensor elements, and wherein the second intersection of sensor elements shares one sensor element in common with the first intersection.

4. The method of claim 3 wherein identifying the at least one of the possible contact locations as the actual contact location comprises:
    comparing a first capacitance value measured from the first intersection with a second capacitance value measured from the second intersection; and
    identifying the actual contact location based on the comparing.

5. The method of claim 4, wherein identifying the actual contact location based on the comparing further comprises identifying as the actual contact location the possible contact location corresponding the intersection, of the first intersection and the second intersection, having a higher capacitance value.

6. The method of claim 1, wherein identifying the at least one of the possible contact locations as the actual contact location comprises:
    comparing a first capacitance value measured from the first intersection with one or more of the plurality of capacitance values from the first scan cycle; and
    identifying the actual contact location based on the comparing.

7. The method of claim 1, wherein performing the resolve scan cycle further comprises measuring a capacitance for one or more sensor elements adjacent to the first intersection.

8. The method of claim 1, further comprising:
    determining, based on the plurality of capacitance values, that two or more of the possible contact locations are aligned in the same direction as an axis of one or more of the plurality of sensor elements; and
    in response to determining that the two or more of the possible contact locations are aligned, identifying each of the two or more possible contact locations as actual contact locations.

9. An apparatus, comprising:
an interface configured to receive signals representative of a plurality of capacitance values measured from a plurality of capacitive sensor elements of a touch-sensing surface, wherein the plurality of capacitance values indicates a presence of multiple contacts at the touch-sensing surface; and
a processing logic coupled with the interface, wherein the processing logic is configured to:
based on the plurality of capacitance values, calculate a plurality of coordinates indicating a plurality of possible contact locations for the multiple contacts;
in response to receiving the plurality of calculated coordinates, select a first intersection a pair of sensor elements of the plurality of sensor elements, the pair of sensor elements each having capacitance values affected by the presence of at least one of the multiple contacts, wherein the first intersection corresponds to a first possible contact location of the possible contact locations;
after selecting the first intersection and prior to measuring a capacitance value of any of the plurality of sensor elements having a capacitance value that is unaffected by the presence of the at least one of the multiple contacts, perform a resolve scan cycle of the selected first intersection of sensor elements to measure one or more capacitance values by sensing the selected first intersection; and
determine whether a second possible contact location different from the first contact location is an actual contact location
based on the one or more capacitance values measured from the selected first intersection during the resolve scan cycle, and
prior to sensing an intersection corresponding to the second possible contact location after sensing of the selected first intersection during the resolve scan cycle.

10. The apparatus of claim 9, wherein the plurality of capacitance values comprises a self-capacitance value for each of the plurality of sensor elements, wherein the apparatus further comprises a capacitance sensor coupled with the processing logic, and wherein the capacitance sensor is configured to:
perform the first scan cycle by measuring the self-capacitance value for each of the plurality of sensor elements, and
perform the resolve scan cycle by measuring a mutual capacitance between sensor elements intersecting at the first intersection.

11. The apparatus of claim 9, further comprising a capacitance sensor coupled with the processing logic, wherein the capacitance sensor is configured to perform the resolve scan cycle by measuring a first capacitance value from the first intersection and measuring a second capacitance value from a second intersection of sensor elements of the plurality of sensor elements, wherein the second intersection of sensor elements shares a sensor element in common with the first intersection.

12. The apparatus of claim 11, wherein the processing logic is further configured to identify the at least one of the possible contact locations as the actual contact location by:
comparing the first capacitance value with the second capacitance value; and
identifying as the actual contact location the possible contact location corresponding the intersection, of the first intersection and the second intersection, having a higher capacitance value.

13. The apparatus of claim 9, wherein the processing logic is further configured to identify the at least one of the possible contact locations as the actual contact location by:
comparing a first capacitance value measured from the first intersection with one or more of the plurality of capacitance values from the first scan cycle; and
identifying the actual contact location based on the comparing.

14. The apparatus of claim 9, wherein the processing logic is further configured to perform the resolve scan cycle by additionally measuring a capacitance for one or more sensor elements adjacent to the first intersection.

15. The apparatus of claim 9, wherein the processing logic is further configured to:
determine, based on the plurality of capacitance values, that two or more of the possible contact locations are aligned in the same direction as an axis of one or more of the plurality of sensor elements; and
in response to determining that the two or more of the possible contact locations are aligned, identify each of the two or more possible contact locations as actual contact locations.

16. A capacitance sensing system, comprising:
a touch-sensing surface comprising a plurality of capacitive sensor elements;
a capacitance sensor coupled with the plurality of capacitive sensor elements, wherein the capacitance sensor is configured to perform a first scan cycle of a plurality of sensor elements of a touch-sensing surface to detect a plurality of capacitance measurements indicating a presence of multiple contacts at the touch sensing surface;
an interface configured to receive signals representative of the plurality of capacitance measurements; and
a processing logic coupled with the interface, wherein the processing logic is configured to:
calculate a plurality of coordinates indicating a plurality of possible contact locations for the multiple contacts;
in response to receiving the plurality of coordinates, select a first intersection of a pair of sensor elements of the plurality of sensor elements, the pair of sensor elements each having capacitance values affected by the presence of at least one of the multiple contacts during the first scan cycle, wherein the first intersection corresponds to a first possible contact location of the plurality of possible contact locations;
after selecting the first intersection and prior to measuring a capacitance value of any of the plurality of sensor elements having a capacitance value that is unaffected by the presence of the at least one of the multiple contacts during the first scan cycle, perform a resolve scan cycle of the selected first intersection of sensor elements to measure one or more capacitance values by sensing the selected first intersection; and
determine whether a second possible contact location different from the first contact location is an actual contact location
based on the one or more capacitance values measured from the selected first intersection during the resolve scan cycle, and prior to sensing an intersection corresponding to the second possible contact location after sensing of the selected first intersection during the resolve scan cycle.

17. The capacitance sensing system of claim 16, wherein the plurality of capacitance values comprises a self-capacitance value for each of the plurality of sensor elements, wherein the capacitance sensing system further comprises a capacitance sensor coupled with the processing logic, and wherein the capacitance sensor is configured to:
   perform the first scan cycle by measuring the self-capacitance value for each of the plurality of sensor elements, and
   perform the resolve scan cycle by measuring a mutual capacitance between sensor elements intersecting at the first intersection.

18. The capacitance sensing system of claim 16, further comprising a capacitance sensor coupled with the processing logic, wherein the capacitance sensor is configured to perform the resolve scan cycle by measuring a first capacitance value from the first intersection and measuring a second capacitance value from a second intersection of sensor elements of the plurality of sensor elements, wherein the second intersection of sensor elements shares a sensor element in common with the first intersection.

19. The capacitance sensing system of claim 18, wherein the processing logic is further configured to identify the at least one of the possible contact locations as the actual contact location by:
   comparing the first capacitance value with the second capacitance value; and
   identifying as the actual contact location the possible contact location corresponding the intersection, of the first intersection and the second intersection, having a higher capacitance value.

20. The capacitance sensing system of claim 16, wherein the processing logic is further configured to identify the at least one of the possible contact locations as the actual contact location by:
   comparing a first capacitance value for the first intersection with one or more of the plurality of capacitance values from the first scan cycle; and
   identifying the actual contact location based on the comparing.

* * * * *